United States Patent
Cher et al.

(10) Patent No.: US 8,312,219 B2
(45) Date of Patent: Nov. 13, 2012

(54) HYBRID CACHING TECHNIQUES AND GARBAGE COLLECTION USING HYBRID CACHING TECHNIQUES

(75) Inventors: Chen-Yong Cher, Port Chester, NY (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/395,860

(22) Filed: Mar. 2, 2009

(65) Prior Publication Data
US 2010/0223429 A1  Sep. 2, 2010

(51) Int. Cl.
*G06F 12/08* (2006.01)
*G06F 12/02* (2006.01)

(52) U.S. Cl. ............... 711/120; 711/129; 711/E12.046; 711/E12.009; 707/813

(58) Field of Classification Search ................. 711/120, 711/129
See application file for complete search history.

(56) References Cited

U.S. PATENT DOCUMENTS

| | | | |
|---|---|---|---|
| 5,625,835 A | 4/1997 | Ebcioglu et al. | |
| 5,710,907 A | 1/1998 | Hagersten et al. | |
| 5,761,515 A | 6/1998 | Barton, III et al. | |
| 5,822,757 A * | 10/1998 | Chi | 711/129 |
| 5,893,144 A | 4/1999 | Wood et al. | |
| 5,926,829 A | 7/1999 | Hagersten et al. | |
| 6,000,017 A | 12/1999 | Hayek et al. | |
| 6,122,708 A * | 9/2000 | Faraboschi et al. | 711/118 |
| 6,202,129 B1 * | 3/2001 | Palanca et al. | 711/133 |
| 6,243,791 B1 * | 6/2001 | Vondran, Jr. | 711/120 |
| 6,427,190 B1 | 7/2002 | Hansen | |
| 6,643,745 B1 | 11/2003 | Palanca et al. | |
| 6,678,796 B1 | 1/2004 | Kosche et al. | |
| 6,732,237 B1 * | 5/2004 | Jacobs et al. | 711/119 |
| 6,973,536 B1 | 12/2005 | Jacobs et al. | |
| 6,983,346 B2 | 1/2006 | Zhang | |
| 7,188,234 B2 | 3/2007 | Wu et al. | |
| 7,330,938 B2 | 2/2008 | Nenov et al. | |
| 7,493,452 B2 | 2/2009 | Eichenberger et al. | |
| 2001/0051977 A1 | 12/2001 | Hagersten | |
| 2002/0194210 A1 | 12/2002 | Subramoney et al. | |
| 2004/0168027 A1 * | 8/2004 | Hu et al. | 711/120 |

(Continued)

OTHER PUBLICATIONS

Sarita V. Adve, Vikram S. Adve, Mark D. Hill, and Mary K. Vernon. "Comparison of Hardware and Software Cache Coherence Schemes." 1991. ACM. ISCA '91.*

(Continued)

*Primary Examiner* — Charles Rones
*Assistant Examiner* — Nathan N Sadler
(74) *Attorney, Agent, or Firm* — Stephen J. Walder, Jr.; William Stock

(57) ABSTRACT

Hybrid caching techniques and garbage collection using hybrid caching techniques are provided. A determination of a measure of a characteristic of a data object is performed, the characteristic being indicative of an access pattern associated with the data object. A selection of one caching structure, from a plurality of caching structures, is performed in which to store the data object based on the measure of the characteristic. Each individual caching structure in the plurality of caching structures stores data objects has a similar measure of the characteristic with regard to each of the other data objects in that individual caching structure. The data object is stored in the selected caching structure and at least one processing operation is performed on the data object stored in the selected caching structure.

18 Claims, 14 Drawing Sheets

U.S. PATENT DOCUMENTS

| | | | | |
|---|---|---|---|---|
| 2004/0186862 | A1* | 9/2004 | Garthwaite | 707/206 |
| 2006/0080661 | A1 | 4/2006 | Brokenshire et al. | |
| 2006/0085591 | A1 | 4/2006 | Kumar et al. | |
| 2006/0112237 | A1 | 5/2006 | Chen et al. | |
| 2006/0123405 | A1 | 6/2006 | O'Brien et al. | |
| 2007/0186039 | A1 | 8/2007 | Nam | |
| 2007/0255909 | A1* | 11/2007 | Gschwind et al. | 711/147 |
| 2007/1026104 | | 11/2007 | Chen et al. | |
| 2007/0283098 | A1 | 12/2007 | O'Brien et al. | |
| 2007/0288692 | A1 | 12/2007 | Bruce et al. | |
| 2008/0046657 | A1 | 2/2008 | Eichenberger et al. | |
| 2008/0065809 | A1 | 3/2008 | Eichenberger | |
| 2008/0077743 | A1 | 3/2008 | Laudon | |
| 2008/0091646 | A1 | 4/2008 | Al-Omari et al. | |
| 2008/0140937 | A1* | 6/2008 | Nalawade et al. | 711/119 |

OTHER PUBLICATIONS

Yefim Shuf, Manish Gupta, Rajesh Bordawekar, and Jaswinder Pal Singh. "Exploiting Prolific Types for Memory Management and Optimizations." Jan. 2002. ACM. POPL '02.*

Michael Hicks, Luke Hornof, Jonathan T. Moore, and Scott M. Nettles. "A Study of Large Object Spaces." 1998. ACM. ISMM '98.*

Julia Hall. "Comcast's High Speed Internet Makes Downloading New Software Easy." Jun. 2007. http://ezinearticles.com/?Comcasts-High-Speed-Internet-Makes-Downloading-New-Software-Easy.*

Carl S. Lebsack and J. Morris Chang. "Using Scratchpad to Exploit Object Locality in Java." 2005. IEEE. ICCD '05.*

Nghi Nguyen, Angel Dominguez, and Rajeev Barua. "Scratch-Pad Memory Allocation without Compiler Support for Java Applications." 2007. ACM. CASES '07.*

Jaejin Lee, Sangmin Seo, Chihun Kim, Junghyun Kim, Posung Chun, Zehra Sura, Jungwon Kim, and SangYong Han. "COMIC: A Coherent Shared Memory Interface for Cell BE." Oct. 2008. ACM. PACT '08.*

F. Jesus Sanchez et al. "Software Management of Selective and Dual Data Caches." Mar. 1997. IEEE. Computer Architecture Newsletter.*

Marc Gonzalez et al. "Hybrid Access-Specific Software Cache Techniques for the Cell BE Architecture." Oct. 2008. ACM. PACT '08.*

Chen-Yong Cher and Michael Gschwind. "Cell GC: Using the Cell Synergistic Processor as a Garbage Collection Coprocessor." Mar. 2008. ACM. VEE '08.*

Cher, Chen-Yong et al., "Cell GC: Using the Cell Synergistic Processor as a Garbage Collection Coprocessor", ACM, VEE'08, Mar. 5-7, 2008, 10 pages.

Heil, Timothy H. et al., "Concurrent Garbage Collection Using Hardware-Assisted Profiling", ACM, International Symposium on Memory Management, 2000, pp. 1-14.

Plakal, Manoj et al., "Concurrent Garbage Collection Using Program Slices on Multithreaded Processors", ACM, International Symposium on Memory Management, 2001, 7 pages.

Boehm, Hans-J., "Fast Multiprocessor Memory Allocation and Garbage Collection", Hewlett-Packard Company, HP Labs Technical Report 2000-0165, 2000, 9 pages.

U.S. Appl. No. 12/182,053, filed Jul. 29, 2008, Cher et al.

Cher, Chen-Yong et al., "Accelerating Explicitly Managed Memory Hierarchies with a Software-Implemented Capitulative Load", U.S. Appl. No. 12/182,053, filed Jul. 29, 2008.

Final Office Action mailed Jun. 1, 2009 for U.S. Appl. No. 12/182,053, 10 pages.

Office Action mailed Apr. 23, 2009 for U.S. Appl. No. 12/182,053, 10 pages.

* cited by examiner

HYBRID CACHING TECHNIQUES AND GARBAGE COLLECTION USING HYBRID CACHING TECHNIQUES

BACKGROUND

The present application relates generally to an improved data processing apparatus and method and more specifically to hybrid caching techniques and a garbage collection accelerator that uses hybrid caching techniques for explicitly managing memory hierarchies.

When computer programs execute, they allocate memory for data buffers. When the computer program continues to allocate such memory, it may eventually exceed the physical memory capacity. In such a situation, the operating system must place portions of the program in virtual memory, i.e. on disk, in order to continue executing, which slows down execution of the computer program. Manually de-allocating memory after a routine no longer needs that portion of memory is a tedious task which programmers often forget to do, or do not do properly.

As an alternative to manual de-allocation of memory, garbage collection was developed. Garbage collection is the use of a software routine that searches memory for areas of inactive data and instructions in order to reclaim that space for the general memory pool, i.e. the heap. A garbage collector basically works by determining what data objects in a program will not be accessed in the future execution of the program, and reclaiming storage used by those objects.

Garbage collection automates the freeing up of memory so that the programmer no longer has to worry about releasing objects that are no longer needed. As a result, this source of considerable program design effort may be avoided. Moreover, garbage collection aids in making programming languages safer due to the reduction in several classes of runtime errors, e.g., dangling pointer errors where a reference to a de-allocated object is used.

Many computer programming languages, referred to as garbage-collected languages, now require garbage collection either as part of the language specification (e.g., Java, C#, and most scripting languages) or as part of practical implementation (e.g., formal languages like lambda calculus). Other computer programming languages are designed for use with manual memory management, but have garbage collected implementations (e.g., C, C++). Still other computer programming languages, such as Modula-3, allow both garbage collection and manual memory management to co-exist in the same application by using separate heaps for collected and manually managed objects.

Tracing garbage collectors are the most common type of garbage collector. Tracing garbage collectors focus on determining which objects are reachable, or potentially reachable, and then discarding all remaining objects. A reachable object may be defined as a data object for which there exists some name, e.g., a variable or the like, in the program environment that leads to it, either directly or through references from other reachable data objects. More precisely, data objects, hereafter referred to as simply "objects," can be reachable in only two ways. First, a distinguished set of objects are assumed to be reachable, these are known as the roots. Typically, these include all the objects referenced from anywhere in the call stack, i.e. all local variables and parameters in the functions currently being invoked, and any global variables. Second, anything referenced from a reachable object is itself reachable. This is referred to as transitivity.

Tracing garbage collectors use an algorithm in which they perform garbage collection cycles. A cycle is started when the collector decides, or is notified, that it needs to reclaim storage, which in particular happens when the system is low on memory. All tracing garbage collectors implement some variant of the tri-color marking abstraction, but simple collectors, such as the mark-and-sweep collector, often do not make this abstraction explicit. Tri-color marking works as follows.

First, initial white, grey and black sets are created that will be used to maintain progress during the cycle. Initially, the white set, or condemned set, is the set of objects that are candidates for having their memory recycled. The black set is the set of objects that can be easily proven to have no references to objects in the white set. In many implementations the black set starts off empty. The grey set is all the remaining objects that may or may not have references to objects in the white set. These sets partition memory such that every object in the system, including the root set, is in precisely one set.

Thereafter, an object in the grey set is selected. This object is blackened, i.e. moved to the black set, by "greying" all the white objects it references directly, i.e. blackening all the white objects that the object references and objects that they reference. This step is repeated until the grey set is empty. When there are no more objects in the grey set, then all the objects remaining in the white set are provably not reachable and the storage occupied by them can be reclaimed.

With the tri-color marking algorithm, no black object points directly to a white object. This ensures that the white objects can be safely deallocated once the grey set is empty.

Once the unreachable set, i.e. the resulting white set when the grey set is empty, has been determined, the garbage collector may simply release the unreachable objects and leave everything else as it is. Alternatively, the garbage collector may copy some or all of the reachable objects into a new area of memory, updating all references to those objects as needed. These are called "non-moving" and "moving" garbage collectors, respectively.

Tracing collectors may also be categorized by considering how the three sets of objects (white, grey, and black) are maintained during a collection cycle. The most straightforward approach is the semi-space collector, which is a moving garbage collection scheme in which memory is partitioned into a "from space" and "to space". Initially, objects are allocated into "to space", until it becomes full and a garbage collection cycle is triggered. At the start of the garbage collection, the "to space" becomes the "from space", and vice versa. The objects reachable from the root set are copied from the "from space" to the "to space". These objects are scanned in turn, and all objects that they point to are copied to "to space" until all reachable objects have been copied to "to space". Once the program continues execution, new objects are once again allocated from the "to space" until it is once again full and the process is repeated. This approach has the advantage of conceptual simplicity, since the three object color sets are implicitly constructed during the copying process, but the disadvantage that a very large contiguous region of free memory may possibly be needed on every collection cycle.

In general, a mark-and-sweep garbage collector maintains one or two bits with each object to record whether it is white or black. The grey set is either maintained as a separate list or is identified using another bit. As the reference tree is traversed during a collection cycle, these bits are manipulated by the collector to reflect the current state, i.e. white, black, or grey. The mark and sweep strategy has the advantage that, once the unreachable set is determined, i.e., the resulting white set after the grey set is empty, either a moving or non-moving collection strategy can be pursued. This choice of strategy can even be made at runtime, as available memory permits.

In some implementations of garbage collectors, the mark and sweep garbage collector uses an explicit stack to store objects which are known to be reachable, but whose contents have not yet been examined (i.e. the "grey" objects). Each entry in the stack contains a base address and a mark descriptor, indicating the location of possible pointers relative to that starting address. Mark descriptors typically take the form of either a simple length specification, or a bit vector describing pointer locations.

In addition to the above, garbage collectors may also be of various types with regard to how they interrupt other operations of the system in which they operate. For example, "stop-the-world" garbage collectors completely halt execution of the program to run a collection cycle, thus guaranteeing that new objects are not allocated and objects do not suddenly become unreachable while the collector is running. This has the obvious disadvantage that the program can perform no useful work while a collection cycle is running.

"Incremental" garbage collectors are designed to reduce this disruption by interleaving their work with activity from the main program. Careful design is necessary to ensure that the main program does not interfere with the garbage collector and vice versa. For example, when the program needs to allocate a new object, the runtime system may either need to suspend it until the collection cycle is complete or somehow notify the garbage collector that there exists a new, reachable object.

Finally, a concurrent garbage collector can run concurrently in real time with the main program on a symmetric multiprocessing machine. Complex locking regimes may be necessary in order to guarantee correctness. Moreover, cache issues also make this less helpful than one might imagine. Nonetheless, concurrent garbage collection may be desirable for symmetric multiprocessor (SMP) applications with high performance requirements.

SUMMARY

In one illustrative embodiment, a method, in a data processing system, is provided for caching data objects in at least one caching structure of a plurality of caching structures. The method comprises determining, by a processor of the data processing system, a measure of a characteristic of a data object. The characteristic is indicative of an access pattern associated with the data object. The method further comprises selecting, by the processor, one caching structure from the plurality of caching structures in which to store the data object based on the measure of the characteristic. Each individual caching structure in the plurality of caching structures stores data objects having a similar measure of the characteristic with regard to each of the other data objects in that individual caching structure. Moreover, the method comprises storing the data object in the selected caching structure and performing, by the processor, at least one processing operation on the data object stored in the selected caching structure.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
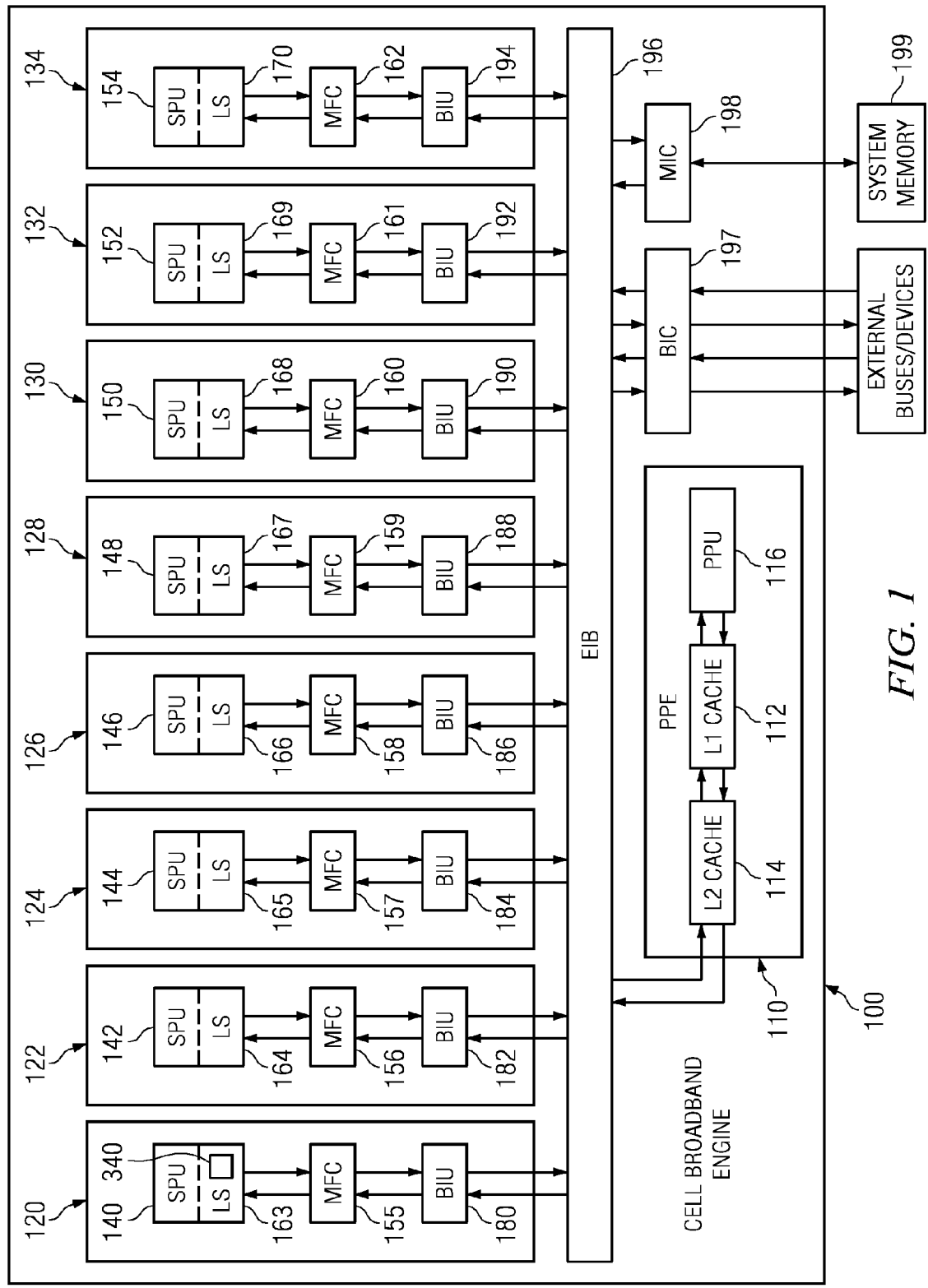
FIG. 1 is an example block diagram of a data processing system in which aspects of the present invention may be implemented.

Traditional computer systems use caches to reduce average memory latency by providing non-architected temporary high-speed storage close to microprocessors. While this design choice reduces average latency and presents the programmer with a "flat" memory hierarchy model, the cost of maintaining this illusion is significant. This cost includes chip area for circuitry to store cache directories, perform tag match operations, and implement cache miss recovery. This cost further includes the impact of cache miss logic operations on cycle time or on the operation of complex speculative logic, as well as runtime costs such as coherence traffic which increases as the number of processors are scaled up in multiprocessor systems.

To counter this trend and offer low latency storage with guaranteed access time, an increasing number of designs are offering fast, architected on-chip storage. Among these designs is the Cell Broadband Engine (CBE) available from International Business Machines Corporation of Armonk, N.Y. The CBE, in one implementation, offers eight high-performance RISC-based processor cores with dedicated architected low latency storage in the form of the SPE local store, as discussed hereafter.

These architected low latency stores or memories are most commonly used to store a set of processor-local data or to contain working copies of large data sets. While local storage offers significant potential for processing with data intensive applications, little exploration has been performed into the use of local memories for managed runtime environments. Moreover, there are no mechanisms for automatic memory management with garbage collection using local memories or stores in a heterogeneous multiprocessor system.

The illustrative embodiments provide a hybrid caching mechanism that may be utilized for a plurality of different purposes. One such purpose is garbage collection. In accordance with some illustrative embodiments a hybrid caching mechanism and garbage collection accelerator are provided, which may be provided as a co-processor, for example, that implements a garbage collection scheme on a heterogeneous multiprocessor system. An example implementation of the use of a processor in the CBE as a garbage collection coprocessor is described in Cher et al., "Cell GC: Using the Cell Synergistic Processor as a Garbage Collection Coprocessor," ACM Conference on Virtual Execution Environments VEE 2008, Seattle, Wash., Mar. 5-7, 2008, incorporated herein by reference and authored by the same inventors of the present application.

In one illustrative embodiment, a garbage collection co-processor or accelerator is provided that runs applications with a Boehm-Demers-Weiser (BDW) mark-sweep garbage collector on a Cell Broadband Engine (CBE) multiprocessor system. The mechanisms of the illustrative embodiments optimize garbage collection performance for a processor with an explicitly managed local memory or store (hereafter referred to as the local store) by managing the local store using caching and pre-fetching techniques with a Direct Memory Access (DMA) copy engine. The garbage collection mechanisms of the illustrative embodiments exploit the local stores and utilize object attributes and access behavior patterns to improve the performance of the marking phase of the garbage collection operation.

As will be described hereafter, the mechanisms of the illustrative embodiments use the local stores for offloading the mark phase of the garbage collection to a garbage collection accelerator. The mechanisms of the illustrative embodiments use memory flow controller (MFC) maintained caching data structures to improve garbage collection performance on the garbage collection accelerator. The mechanisms of the illustrative embodiments utilize hybrid caching schemes adapted to the behavior of different object data types and their memory reference behavior to improve the garbage collection performance utilizing these various caching data structures.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The mechanisms of the illustrative embodiments may be implemented in any heterogeneous multiprocessor system in which garbage collection needs to be performed. Examples of such heterogeneous multiprocessor systems include NUMA systems, non-SMP multiprocessor systems, and the like. One such heterogeneous multiprocessor system in which example aspects of the illustrative embodiments may be implemented is the Cell Broadband Engine (CBE) available from International Business Machines Corporation of Armonk, N.Y. While the illustrative embodiments will be described in terms of the mechanisms being implemented in the CBE architecture, it should be appreciated that this is only example and the mechanisms of the illustrative embodiments may also be implemented in other heterogeneous multiprocessor systems without departing from the spirit and scope of the present invention. In yet another illustrative embodiment, the mechanism of the illustrative embodiments are implemented in any processor with a local store to provide garbage collection to processors with explicitly managed memory hierarchies.

FIG. 1 is an example block diagram of a data processing system in which aspects of the present invention may be implemented. The example data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a Power processor element (PPE) 110 having a processor (PPU) 116 and its L1 and L2 caches 112 and 114, and multiple synergistic processor elements (SPEs) that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU executes SIMD vector instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one example embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2:
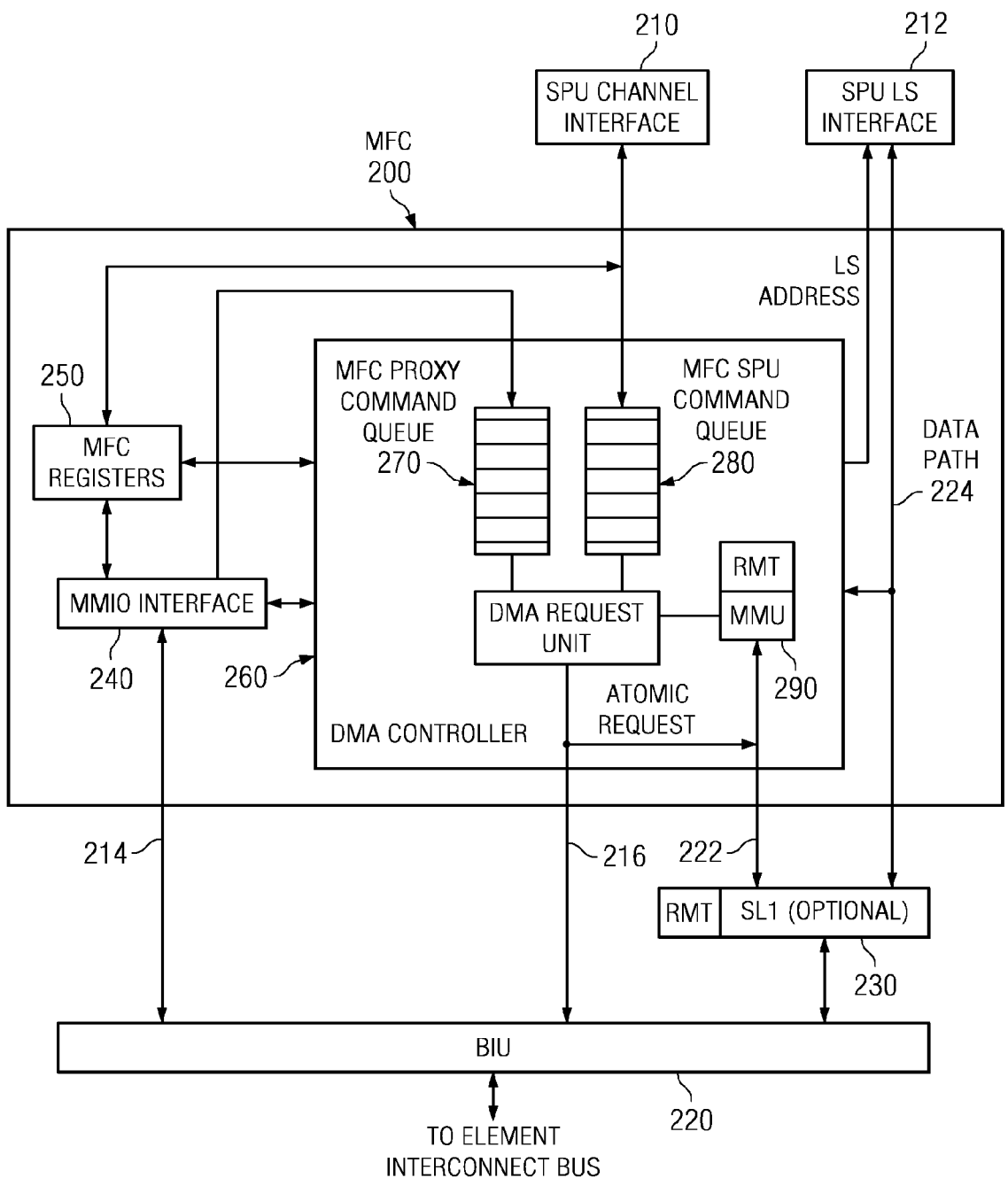
FIG. 2 is an example block diagram of a typical memory flow control (MFC) unit in accordance with an example embodiment of the present invention.

FIG. 2 is an example block diagram of a typical memory flow control (MFC) unit 200 in accordance with an example embodiment of the present invention. In this example embodiment, the MFC 200 has two interfaces 210 and 212 to the SPU, two interfaces 214 and 216 to the Bus Interface Unit (BIU) 220, and two interfaces 222 and 224 to an optional SL1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local storage in the SPU. One interface 216 to the BIU 220 allows Memory Mapped I/O (MMIO) access to the MFC facilities. This interface 216 also allows other processors to issue MFC commands. Commands issued using MMIO are referred to as MFC proxy commands.

The interfaces 222 and 224 to the SLI cache are mainly for data transfers. One interface 222 is used by the MFC 200 for access to the address translation tables in main storage and the other 224 is used for the transfer of data between main storage and local storage.

As shown in FIG. 2, the main units in a typical MFC include a memory mapped input/output (MMIO) interface 240, MFC registers 250, and Direct Memory Access (DMA) controller 260. The MMIO interface 240 maps the MFC facilities of the SPU into the real address space of the system. This allows access to the MFC facilities from any processor, or any device in the system. In addition, the MMIO interface 240 may be configured to map the local storage of the SPU into the real address space. This allows direct access to the local storage from any processor or any device in the system, enabling local-store-to-local-store transfers and the ability for I/O devices to directly access the local storage domain of an SPU.

The synchronization and the transfer of data is generally the responsibility of the DMAC 260 within the MFC 200. The DMAC 260 can move data between the local storage of an SPU and the main storage area, e.g., system or main memory, such as shared memory 199 in FIG. 1. Optionally, the data can be cached in the SL1 cache.

MFC commands provide the main method that enables code executing in a SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

Commands that transfer data are referred to as MFC DMA commands. These commands are converted into DMA transfers between the local storage domain and main storage domain. Each MFC can typically support multiple DMA transfers at the same time and can maintain and process multiple MFC commands. Each MFC DMA data transfer command request involves both a local storage address (LSA) and an effective address (EA). The local storage address can directly address only the local storage area of its associated SPU. The effective address has a more general application in that it can reference main storage, including all the SPU local storage areas, if they are aliased into the real address space.

With reference again to FIG. 1, it should be noted that the SPU 140-154 cannot access system or main memory, e.g., shared memory 199, directly but can issue DMA commands to the MFC 155-162 to bring data into the local store memory 163-170 or write computation results back to system or main memory 199. The SPU 140-154 can continue program execute while the MFC 155-162 independently performs these DMA transactions. In one illustrative embodiment, no hardware data-load prediction structures exist for local store memory management and thus, each local store memory is explicitly managed by software, i.e. the local store memory structures represent an explicitly managed memory hierarchy (EMMH).

In the PPE 110, effective addresses are used to specify memory addresses for lad and store instructions. On the SPE 120-134, these same effective addresses are used by the SPE to initiate the transfer of data between system or main memory 199 and the local store memory 163-170 by programming the MFC 140-154. The MFC 140-154 translates the effective address, using segment tables and page tables, to an absolute address when initiating a DMA transfer between an SPE's local store memory 163-170 and shared memory 199.

MFC 140-154 data transfers provide coherent data operations to ensure seamless data sharing between PPEs 110 and SPEs 120-134. Thus, while performing a shared memory 199 to local store 163-170 transfer, if the most recent data is contained in a PPE's cache hierarchy, the MFC data transfer will snoop the data from the cache. Likewise, during local store 163-170 to shared memory 199 transfers, cache lines corresponding to the transferred data region are invalidated to ensure the next data access by the PPE 110 will retrieve the correct data. Finally, the MFC's memory management unit (MMU) 290 maintains coherent translation lookaside buffers (TLBs) with respect to the system-wide page tables.

While the MFC 140-154 provides coherent transfers and memory mapping, a data transfer from shared memory 199 to local store 163-170 creates a data copy. If synchronization between multiple data copies is required, this must be provided by an application-level mechanism. As will be described hereafter, the illustrative embodiments provide application level mechanisms for ensuring the synchronization between shared memory 199 and local stores 163-170 with regard to garbage collection operations.

MFC 140-154 transfers between shared memory 199 and an SPE's local store 163-170 can be initiated either by the local SPE 120-134 using SPU channel commands, or by remote processor elements (either a PPE 110 or an SPE 120-134) by programming the MFC 140-154 via its memory mapped I/O (MMIO) interface 240. Using self-paced SPU accesses to transfer data is preferable to remote programming because transfers are easier to synchronize with processing from the SPE 120-134 by querying the status channel, and because SPU channel commands offer better performance. In addition to the shorter latency involved in issuing a channel instruction from the SPU compared to a memory mapped I/O (MMIO) access to an uncached memory region, in one illustrative embodiment, the DMA request queue accepting requests from the local SPU contains 16 entries compared to the eight entries available for buffering requests from remote nodes. Some features, such as the DMA list command, are only available from the local SPE via the channel interface.

Performing an actual data transfer from the PPE or remote SPE via the MMIO interface requires two communication events: a first to indicate the SPE 120-134 is ready to receive data because it has completed the previous work assignment, and a second synchronization to indicate the completion of a PPE-side transfer. From a programming point of view, SPE-initiated DMA request are preferable because they reduce the need for double handshake communication, channel accesses to the MFC 140-154 are cheaper, and because in parallel programs they prevent the PPE 110 from becoming a bottleneck. In one illustrative embodiment, this preference is reflected in the sizing of request queues, where each MFC has 16 transfer request entries in its queue reserved for the local SPE and another 8 entries accessible by the PPE and remote SPEs via memory mapped I/O (MMIO) registers.

Referring again to FIG. 1, the local stores 163-170 of the CBE 100 are typically architected as data repositories for processor local data or as a staging ground for partitioned large dense data sets. Storing local data in a local store is attractive because the local store provides access to the local data with guaranteed low latency and without the overhead of coherence protocols when executed in a multiprocessor system. For data intensive applications, local stores offer an ideal repository for partitioned dense data sets such as found in linear algebra computations used in many numerical applications.

Garbage collection represents the very opposite end of the application space. Garbage collection involves chasing pointers across a large memory space with an infinitesimally small compute to data transfer ratio and non-existing locality. Thus, local stores are at first blush not a prime option for use in performing garbage collection operations. However, as discussed hereafter, the illustrative embodiments provide mechanisms that leverage the locality that is associated with the local stores when performing garbage collection activities.

The Boehm-Demers-Weiser (BDW) mark-and-sweep garbage collector is a popular garbage collector due to its portability and language independence. It epitomizes a class of garbage collectors known as ambiguous roots garbage collectors. Such garbage collectors are able to forego precise information about roots and knowledge of the layout of objects by assuming that any word-sized value is a potential application memory heap reference. Any value that ambiguously appears to refer to the application memory heap, while perhaps simply having a value that looks like an application memory heap reference, is treated as a memory reference and the object to which it refers is considered to be "live," i.e. not a candidate for garbage collection. The ambiguously-referenced objects cannot move since their ambiguous roots cannot be overwritten with a new address of the object, i.e. if the ambiguous value is not really a memory reference, but merely looks like a memory reference, it still should not be modified. The BDW garbage collector treats registers, static areas, and thread activation stacks ambiguously. If object layout information is available, such as from the application programmer or compiler, then the BDW garbage collector can make use of it, but otherwise values contained in objects are also treated ambiguously.

The advantage of ambiguous roots garbage collectors is in their independence of the application programming language and compiler. The BDW garbage collector supports garbage collection for applications coded in C and C++, which preclude accurate garbage collection because they are not data type-safe. BDW is also often used with data type-safe languages whose compilers do not provide the precise information necessary to support accurate garbage collection. The minimal requirement is that source programs not hide memory references from garbage collection and that compilers not perform transformations that hide memory references from garbage collection. Thus, BDW garbage collection is used in more diverse settings than perhaps any other garbage collector. As a result, the BDW garbage collector has been heavily tuned, both for basic performance, and to minimize the negative impact of ambiguous roots.

The basic structure of mark-and-sweep garbage collection, such as implemented by the BDW garbage collector, is depth-first searching of all reachable pointers on an application memory heap. For this purpose, an initial set of root pointers, from the application's register file, application stack, and known roots in the data segment, are used to find memory references into the application's memory heap. This is accomplished by initializing a mark stack with these known roots.

The mark phase removes application memory heap addresses from the mark stack and uses the memory reference in conjunction with information about the object pointed to by the discovered pointer to find any pointers stored in this object. The minimum amount of information necessary about an object is its starting address and length, which can be obtained from the memory allocator. For such an object, any properly aligned data words could be legal pointers. Any newly discovered legal application memory heap addresses found in this way are then pushed on the mark stack and the reachable objects are marked in a mark array. The algorithm iterates until the application memory heap is empty. The following code fragment describes the algorithm in more detail (assuming just a single type of record identified by the record length):

```
while (ptr = pop_mark_stack( ))
    length = alloc_size(ptr);
    for (i = 0...length)
        if (legal_prt(ptr[i])) && ! marked(ptr[i]))
            mark (ptr[i]);
            push_mark_stack(ptr[i]);
```

Once the algorithm has traversed all reachable application memory heap objects, the mark bits represent a bitmap of all reachable objects. All unmarked objects can be de-allocated using a linear sweep over the application memory heap. The sweep can be performed eagerly, at the end of a garbage collection cycle, or lazily, at allocation request. Lazy sweep has preferable cache behavior because it avoids touching large amounts of uncached data for the sole purpose of de-allocation.

Tracing garbage collection schemes, such as are implemented in the BDW garbage collector and other mark-and-sweep garbage collectors, can be classified into stop-the-world and incremental garbage collection schemes. Stop-the-world garbage collection suspends the mutator, i.e. the application associated with the garbage collection operation and for which garbage collection is being performed, until a full pass of the garbage collection is done, thus not allowing any change to the application memory heap space during garbage collection. Incremental garbage collection allows interleaving mutator and garbage collection, either in a sequential or parallel fashion, thus providing the benefit of concurrency but at the cost of tracking liveness coherency between the mutator and the garbage collector.

In one illustrative embodiment of the present invention, a stop-the-world garbage collection approach is used where the mutator executes on the control processor, e.g., the PPE 110 in FIG. 1, and when garbage collection invokes the marking code, control is transferred to the mark code executing on a garbage collection accelerator, which may be a controlled processor, such as SPE 120-134 in FIG. 1, or a garbage collection dedicated co-processor in the multiprocessor system, for example. During this time, the mutator is suspended on the control processor and thus, the control processor becomes available for other processes in the multiprocessor system, which increases the overall system throughput. In this environment, the single garbage collection accelerator can take advantage of all of the controlled processors in the system, e.g., SPEs 120-134, when the control processor, e.g., PPE 110, is running multi-programmed workloads and each program uses a dedicated single controlled processor for its garbage collection.

While a stop-the-world garbage collection is utilized in this illustrative embodiment, the present invention is not limited to such. Rather, the illustrative embodiments may further be applied to an incremental garbage collection scheme or any other garbage collection scheme without departing from the spirit and scope of the present invention. For example, with an incremental garbage collection scheme, the mechanisms of the illustrative embodiments may utilize the same dirty-blocks tracking support used by conventional incremental garbage collectors for maintaining mutator/garbage collector coherency with the garbage collection accelerator of the illustrative embodiments. In such a case, the control processor, e.g., PPE 110, may continue to execute the mutator during the time freed up by the garbage collection accelerator implementing the marking code, e.g., one or more of SPEs 120-134 executing the marking code. In this implementation, because the mutator is rarely suspended to perform garbage collection, concurrency already exists and no incrementality is needed in the garbage collector.

With the garbage collection mechanisms of the illustrative embodiments, the garbage collection tasks are distributed across a control processor, such as the PPE 110, and one or more controlled processors, such as one or more SPEs 120-134, for example. One way in which the garbage collection tasks may be distributed across a control processor and one or more controlled processors is described in co-pending and commonly assigned U.S. patent application Ser. No. 11/380, 683, which is hereby incorporated by reference. As described in this co-pending application, taking an illustrative embodiment in which the garbage collection is distributed across a plurality of the SPEs 120-134, in one illustrative embodiment, the PPE 110 may instruct the SPEs to perform garbage collection so as to reclaim portions of the shared memory 199 that are allocated to memory objects (hereafter referred to as "system memory objects") that are no longer referenced by a program or application running in the heterogeneous processor system. In an alternative illustrative embodiment, the SPEs 120-134 may independently determine that garbage collection is required based on a predetermined criteria, e.g., an amount of free space in the shared memory 199 being below a threshold, and may initiate garbage collection operations themselves. In such an alternative embodiment, the SPE 120-134 detecting the need for garbage collection may communicate this need to the other SPEs 120-134 and the PPE 110.

In response to the instruction from the PPE 110, or alternatively, an SPE 120-134, the SPEs 120-134 spawn collection threads that are used to perform the garbage collection operations described hereafter. The SPEs 120-134, and possibly the PPE 110, stop their execution of other threads, such as in a "stop-the-world" type garbage collection, and execute the spawned collection threads so as to perform the garbage collection.

As part of the garbage collection, the PPE 110 generates a global mark queue that contains references to memory objects in the shared memory 199 for the running program. The generation of such global mark queues is generally known in the art and details are not provided herein. For example, generation of a global mark queue and use of a global mark queue with parallel garbage collection is generally described in Boehm, "Fast Multiprocessor Memory Allocation and Garbage Collection", HP Labs Technical Report 2000-165, Hewlett-Packard Company, 2000, which is hereby incorporated by reference.

The global mark queue may be organized, for example, by memory pages such that references to system memory objects stored on the same memory page are represented in the global mark queue as adjacent entries. In this way, portions of the global mark queue may be easily associated with portions of the shared memory 199.

The collection threads of each of the SPEs 120-134 obtain a portion of the global mark queue and store them in local stores 163-170 associated with the SPEs 120-134. Thus, each SPE 120-134 will have a copy of a different portion of the global mark queue and start marking in shared memory 199 from different ambiguous roots.

The collection threads running on each SPE 120-134 perform a mark-and-sweep operation on each of their respective areas of shared memory 199 based on the system memory objects referenced in the corresponding portion of the global mark queue. The portion of the global mark queue that is retrieved by the SPE 120-134 has references, i.e. pointers, from the program, to system memory objects that are to be checked by the mark-and-sweep operation. It is these references, and their references to dependent memory objects, which are traced during the mark-and-sweep operation to thereby identify which memory objects are reachable and not reachable by the program of interest.

Each of the allocated heap areas may have an associated mark descriptor that identifies the memory object as being reachable or not reachable. The mark descriptors for each heap area may be part of a general heap allocation block descriptor in shared memory 199, separate pages of the shared memory 199, or the like. Memory objects that are part of the portion of the global mark queue copied into the local store 163-170 of the SPE 120-134 and which have not been traced may have their mark descriptor initially set as "0" or "00", for example, to indicate that these objects are not reachable. Thereafter, these mark descriptor values may be set to "1" or "01", for example, as determinations are made, during a marking phase of the mark-and-sweep operation, that the memory objects are reachable.

Thus, initially, all of the memory objects in the heap for the program in question may be set to a "not reachable" state at initialization of a garbage collection operation on the SPEs 120-134. When a portion of the global mark queue is retrieved by an SPE and its corresponding portions of shared memory 199 are loaded into the local store, the address and offset for the memory objects in the portion of the global mark queue are added to the local mark stack. In addition, the mark descriptor for the memory object may be added to a cache targeting mark descriptor data and other heap allocation area information for shared memory 199. Although, for purpose of clarity, the mark descriptor will be shown in the figures and referred to in the description hereafter as a separate data structure from the portion of the global mark queue loaded into the local store, i.e. the local mark stack, it should be appreciated that the mark descriptors may be associated with, and even part of, the entries in the local mark stack for the various memory object references added to the local mark stack.

After having initially populated the local mark stack, the next memory object in the local mark stack is identified and traced using a marking operation of a mark-and-sweep garbage collection operation. That is, the next memory object in the mark stack is marked as reachable and becomes a "current" memory object. The memory objects that are referenced by the "current" memory object are identified from the heap object stored in shared memory 199 loaded in the local store. A determination is made as to whether the memory objects that are referenced by the "current" memory object are legal references to heap objects in shared memory 199. If so, the mark descriptors for these memory objects are then set to a "reachable" state and added to the mark stack.

When all of the system memory objects in the portion of the global mark queue have been checked by the SPE 120-134, through a mark-and-sweep operation as discussed above, the system memory objects which remain unreached, e.g., whose mark descriptors are "0" or "00" (for the objects having been processed by the local SPE) are candidates for having their portion of memory reclaimed. However, this system memory cannot be reclaimed at this time since there may be other references to these memory objects from system memory objects in other portions of the global mark queue, which may or may not be processed by other SPEs 120-134 in the CBE 100, depending upon the particular embodiment.

The collection threads merge reachability information, e.g., mark descriptors, about memory objects obtained from processing the local mark stack with reachability information obtained by processing of other local mark stacks of other SPEs 120-134 to generate global reachability information captured in a global mark descriptor. The global mark descriptor represents those system memory objects that are reachable by the software program and thus, cannot have their system memory reclaimed. System memory objects that do not have references present in the global mark descriptor are candidates for memory reclamation.

Merging a local mark descriptor indicating reachable memory objects with the global descriptor can be achieved by performing a set of OR operations. However, atomicity must be guaranteed, as described by Boehm, op cit. The merge operation therefore, merges mark descriptors for memory objects such that there is a single entry for each merged memory object indicating that the memory object is reachable by the software program in question. That is, the merge operation eliminates any duplicate entries for a same memory object. Thus, with the illustrative embodiments, unlike prior art garbage collectors which update a common mark descriptor, each mark thread contains a local chunk-specific mark descriptor that is merged into a global mark descriptor for the heap associated with the program in question.

Merging can be performed with an adapted memory flow controller (MFC) having support for performing atomic read-modify-write cycles to perform the logical OR of a local mark descriptor into the global mark descriptor, an MFC having been optimized to include specific descriptor merge capabilities, or by using software locks on descriptor maps. Such software locks are ideally obtained only during the short period of the merge process. To optimize merging and reduce contention for merge locks, multiple merge locks corresponding to regions of the mark descriptor can be maintained.

When there are no more references to system memory objects in the updated "to be traced" portion of the global mark queue, each reference to system memory objects in the heap for the software program in question, present in the shared memory 199, will either be marked as being reachable in the global mark descriptor or will be unreachable by the software program in question. Those references to system memory objects not having been reached by the mark process are objects whose corresponding portion of shared memory 199 may be reclaimed. Portions of the shared memory 199 associated with all other system memory objects in the global marked stack are reachable by the software program and thus, are not reclaimed.

A reclamation process may then be performed to reclaim the system memory associated with the system memory objects that are not marked in the global mark descriptor as reachable. Such reclamation processes are generally known as the sweep phase of a mark-and-sweep garbage collection in the art and thus, a detailed explanation of such reclamation processes is not provided herein.

With a mark-and-sweep garbage collection operation, such as the one set forth above, because the sweep phase of the operation has linear behavior when operating on dense mark bits, and because the use of a local memory to store portions of an allocation's freelist and mark bits is rather straightforward, the mechanisms of the illustrative embodiments focus their improvements on the application memory heap traversal during the marking phase where the bulk of the execution time of the garbage collection is spent. Those skilled in the art, in view of the present description, will understand that code to implement the sweep phase of garbage collection can be similarly executed on a processor such as the SPE, by obtaining freelist information and mark bits, and adding unreachable heap areas to the freelist based on the mark bits. Those skilled in the art will further understand the application of the teachings of the use of hybrid caching techniques to such code within the scope of the present invention. With the mechanisms of the illustrative embodiments, the management of the global mark queue, including the discovery of initial root objects, the handling of mark stack overflow, and other special events (such as blacklist management), is maintained on the PPE 110. These functions interact heavily with the managed runtime environment for the application and are best executed on the core executing the application. As described above, portions of the global mark queue may be sent to one or more of the SPEs 120-134 for use during the marking phase in order to offload the marking operations onto a SPE operating as a garbage collection accelerator. Alternatively, a separate dedicated co-processor may be provided to operate as a garbage collection accelerator and such portions of the global mark queue may be provided to a local store associated with this dedicated co-processor. Local store mark stack overflow may be handled by copying the local mark stack back to the global mark queue and then re-obtaining a portion of the global mark queue as needed.

Synchronization between the PPE 110 and the one or more SPEs 120-134 occurs via the mailbox interface which allows efficient transfer between the PPE 110 and the SPE 120-134 of small data quantities. A descriptor address is passed which is used by the SPE 120-134 to copy in a descriptor and the corresponding portion of the global mark queue. Because the SPE 120-134 uses stalling mailbox accesses, this model provides implicit synchronization.

The mark-and-sweep garbage collection mechanisms of the illustrative embodiments may utilize the BDW mark-and-sweep garbage collection algorithm which utilizes the following key data structures: a mark stack that contains system references or pointers to application memory heap blocks that are to be scanned, the heap blocks themselves, and header blocks that contain information, such as types and sizes, about elements in a specific heap block, and a mark bitmap for the heap blocks with the size and granularity specified in the corresponding header block. Of these data structures, the heap blocks, i.e. the allocated heap blocks that are scanned for valid memory references or pointers, are by far the most frequently accessed memory references. Because these structures are frequently accessed in the system memory, their accesses dominate the communication between the SPE 120-134 and the PPE 110. Therefore, these structures become primary targets for optimizing garbage collection performance in the SPE 120-134.

Heap blocks basically contain data and pointers in the system memory that are accessible to the application for its computations. A heap block spans a portion of the system address space that may constitute part of a large object or consist of one or more small objects. In the marking phase of a garbage collection cycle, because of the pointer-chasing nature of accessing heap blocks, the access patterns exhibit poor locality that can hardly be captured by hardware caches or hardware stream pre-fetchers.

The header block is referenced in the marking phase for reading and writing the mark bitmap of an application memory heap reference. An index structure is used to locate header blocks for each application memory heap address. To enable fast lookup of frequently used elements, the BDW garbage collection algorithm comes with an optional lookup table. Each header block contains a bitmap that represents "liveness" for a continuous 4 KB region, for example, where "liveness" indicates whether memory objects associated with references within the region are reachable or not with regard to garbage collection. To avoid repeating marking work when chasing pointer chains in the application memory heap, the mark bit of a memory reference is first read to determine if the chain has previously been chased.

In order to exploit the locality of memory objects, i.e. objects generated by an object-oriented application during its execution, and memory object references, i.e. addresses to or addresses in a memory object, to improve the garbage collection operation, the mark-and-sweep garbage collection mechanisms of the illustrative embodiments (which in one illustrative embodiment utilizes the BDW mark-and-sweep garbage collection algorithm) use a hybrid caching technique. The hybrid caching technique, or scheme, leverages locality of garbage collection accesses, memory object types and sizes, and call site properties where an invocation of certain code may provide hints on liveness of references or changes in object types and sizes, to increase locality/hit rate. With this hybrid caching technique, different cache data structures, i.e. temporary data structures, are used for memory objects having different access behaviors and data patterns. That is, each individual cache data structure stores either the memory objects, or structured objects that reference memory objects, that have uniform access behaviors. In the exemplary garbage collection embodiment using hybrid caching, structured objects are objects that store information about memory objects, e.g., type, size, system memory address, or the like. In the illustrative embodiment of a garbage collector, these memory objects or structured objects are loaded into the cache data structures that are created and maintained during a garbage collection cycle, as they are requested by the garbage collection mark phase, and may be displaced during or at the end of the garbage collection cycle to accommodate the space efficiency of the cache data structure. Objects or structured objects, hereafter collectively referred to as simply "objects," that have uniform access behaviors and data patterns may be accessed more quickly via these cache data structures during garbage collection operations, such as by implementing various shortcut operations based on the known access behaviors or patterns for the particular objects or object references during the marking phase of the garbage collection. Objects may be accessed more quickly by bypassing tag checks of the cache data structure, such as in an operand buffer, or by skipping or not caching object fields that are known to contain no reference.

A separate cache data structure may be provided for storing objects or object references for objects, e.g., in structured objects, that cannot be categorized into another cache data structure having uniform object access behaviors and patterns.

Figure 3:
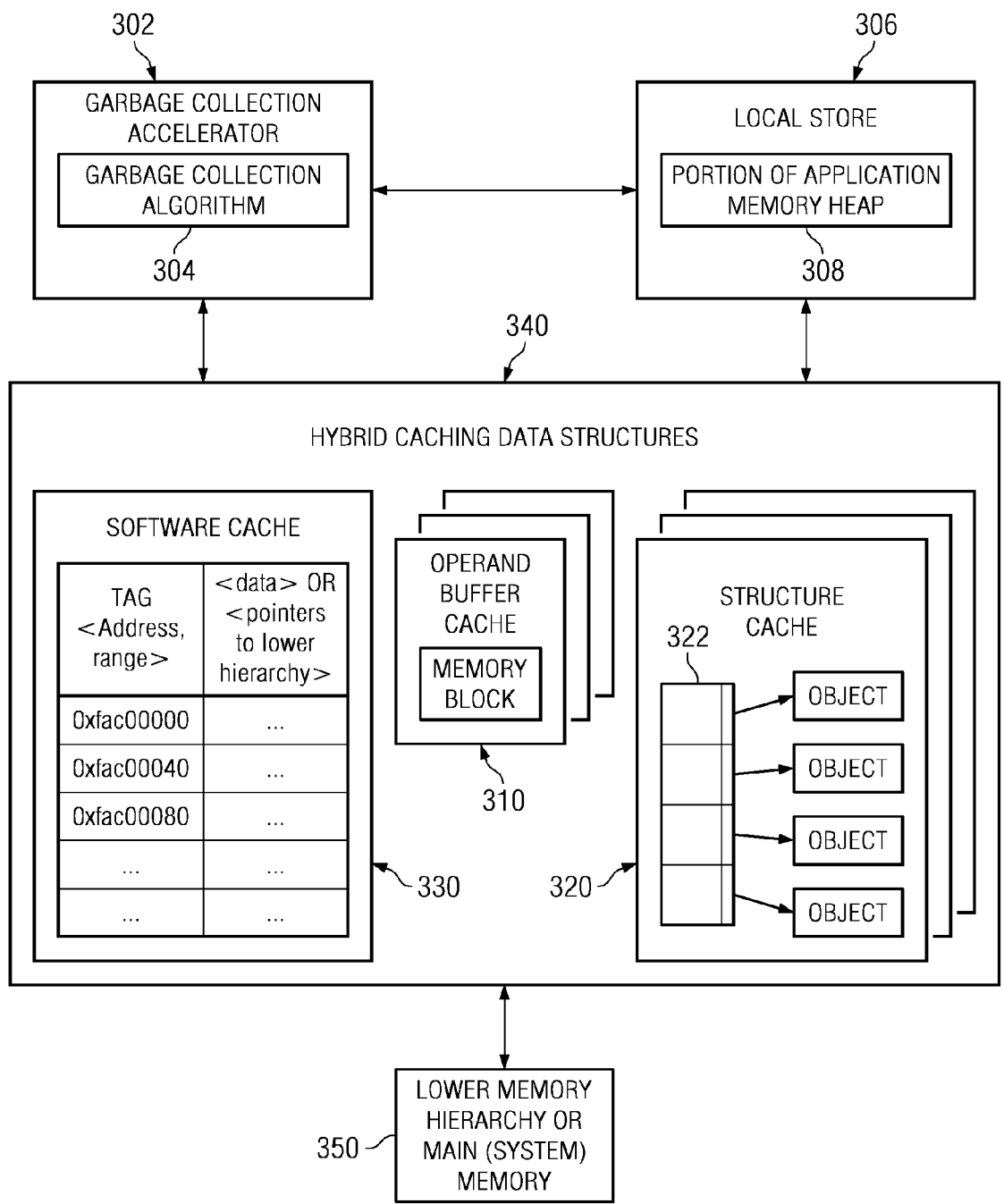
FIG. 3 is an example block diagram illustrating a hybrid caching mechanism in accordance with one illustrative embodiment.

These cache data structures are shown in FIG. 3 which depicts an example diagram of a garbage collection mechanism that may be used to perform garbage collection in accordance with one illustrative embodiment. As shown in FIG. 3, in one illustrative embodiment, a garbage collection accelerator 302 implements a garbage collection algorithm 304 for performing garbage collection operations using local storage 306. The garbage collection accelerator 302 may be, for example, a controlled processor, such as a SPE 120-134 in the CBE 100 for example, or a dedicated processor.

The hybrid caching technique, or scheme, utilizes hybrid caching data structures 340. In one illustrative embodiment, the hybrid caching data structures 340 may be provided in one or more local memories of the processors of a multi-processor system, such as the local stores 163-170 of the SPEs 120-137 of the CBE 100 in FIG. 1. In other illustrative embodiments, the hybrid caching data structures 340 may be maintained in a main or system memory. Moreover, the hybrid caching data structures may be managed by either hardware, software, or any combination of hardware and software mechanisms.

The hybrid caching data structures 340 includes a first cache data structure 310, referred to herein as the operand buffer cache 310. The operand buffer cache 310 is used during garbage collection operations to handle objects associated with memory regions containing homogeneous data, as used by numeric applications to tile matrices in a local store, for example. For example, in one illustrative embodiment, the operand buffer cache 310 is used during garbage collection operations to store large heap-allocated objects to be scanned for pointers. That is, during garbage collection, instead of individually loading each object reference as an MFC request, when scanning a block of pointers ptr[i], the entire block, which could have a size smaller or equal to a heap block, can be retrieved by a single DMA request and loaded into an operand buffer cache 310, referred to herein as operand buffering or caching of memory chunks. These operand buffer caches 310 are explicitly maintained and each operand buffer cache 310 is a distinguished individual copy of a certain memory block. Operand buffer caches 310 are best used for discernable operands which are individually handled, fetched and maintained independently, e.g., in distinct operand buffer caches 310 allocated for this purpose. Likewise, updates to such an object can be gathered in the local store and committed with a single copy back operation.

The correspondence of data in the operand buffer cache 310 to actual system memory 350 or shared memory 199 is implicit, i.e. dedicated address information does not need to be maintained for the operand buffer. In numeric code, for example, the address may be derived from an array base address and a loop index. In garbage collection, the address may correspond to a pointer popped from the local mark stack which may no longer be maintained in a register once scanning of a memory block commences.

A linear scan of memory blocks for pointers can be made more efficient by using a single DMA request that requests a memory range corresponding to a memory object to be scanned for valid application memory heap pointers. The single DMA request may cause the memory range to be loaded into the operand buffer cache 310 and the garbage collection mechanisms may scan the memory range and identify valid application memory heap references or pointers within the memory range. This memory block corresponding to the requested memory range is only maintained in the operand buffer cache 310 long enough to scan for valid application memory heap pointers. Thus, rather than having to check the address range, i.e. the tag, for each individual memory reference using a typical software cache approach in garbage collection, for contiguous blocks of memory, the operand buffer cache 310 may be used to load the memory block, check for valid memory references or pointers, and then discard that memory block without performing performance costly address range checks for each individual reference in the memory block.

A second cache data structure 320, referred to herein as the structure cache 320, caches structured objects corresponding to memory objects which are of a like type and type-defined size (i.e., objects with a known structure). These structured objects corresponding to like memory objects may be collected in the structure cache 320 as the memory objects are used by the application with these structured objects being made available for subsequent memory references in a garbage collection cycle. For example, these structured objects may be record structures, such as header blocks (HBLKs), however other types of structured objects may be used without departing from the spirit and scope of the illustrative embodiments. The memory objects maintain a home location in main memory so that the use of the local store is distinctly for allocating private memory objects in the local store.

What is meant by memory objects having a "like type" is that the memory objects have a common known access behavior that gives hints to liveness and age of the memory objects, known common field attributes that are separated into references and non-references, known common size, or other known common attributes, where "common" means that the attributes, size, or the like are of a same type or same value, although attributes may be of a same type but not necessarily have the same value. For example, in one illustrative embodiment, the structure cache 320 may be organized for storing structured objects referencing memory objects for people. Thus, only structured objects corresponding to people memory objects are stored in that structure cache 320. Hence the people memory objects are of a same type. However, in some illustrative embodiments, the same type does not require all objects to be completely identical with regard to memory object type. For example, consider a structure cache 320 where structured objects may be stored for memory objects representing cars and motorcycles. The structured objects for cars and motorcycles may not be identical, but are sufficiently similar that it may be beneficial to store them in the same structure cache 320. One way in which to measure sufficient like types for memory objects is to determine that objects that are derived from each other in a class hierarchy may be considered of sufficient like type for inclusion in the same structured cache 320.

It should be appreciated that, in some illustrative embodiments, there may be multiple different structure caches 320, each different structure cache corresponding to a different memory object type. Moreover, rather than storing structured objects, that reference memory objects, in the structure caches 320, the structure caches 320 may store collections of replicated system memory objects from system memory 350, i.e. copies of the actual memory objects may be stored in the structure caches 320.

The structure cache 320 is used to store structured objects corresponding to memory objects of known sizes and like types. The structure cache 320 can be either allocated at fixed locations in the local store or dynamically in the local store. When a new memory object is to be scanned, the memory object's size is obtained by looking up the header block (HBLK) in structure cache 320 in accordance with a preferred embodiment. If the HBLK is not in the structure cache 320, it is first read into the structure cache 320. Because the HBLK size and type are fixed and known at runtime, it is preferred to cache HBLKs in the structure cache 320. If the structure cache 320 has reached a maximum size, one or more HBLKs are written out to main memory before the next HBLK structure is loaded. Those skilled in the art, based on the present description, will understand how to apply the teachings contained herein to use one or more of caching data structures 310-330 to store HBLKs in accordance with alternate illustrative embodiments of the present invention.

Access to the structure cache 320 can occur by performing a lookup operation with a system memory address, i.e. where the system memory home location serves as an index, or by a content-based lookup operation, e.g., to find a data type layout descriptor by finding a record associated with a specific data type. In one illustrative embodiment, the structure cache 320 is used for header blocks describing heap allocation areas. In this illustrative embodiment, the structure cache 320 is accessed using a hashed system memory effective address.

In accordance with the illustrative embodiments, the structure cache 320 has a structure cache directory 322 which can use a number of criteria to access objects (or structures) in the structure cache 320. That is, the structure cache directory 322 is a structure cache 320 specific way to track data, e.g., the header blocks (HBLKs) or other structured object corresponding to the memory objects, in the structure cache 320. While HBLKs are used in the garbage collection illustrative embodiments, as noted above, the hybrid caching mechanism of the illustrative embodiments may be used with other applications and thus, the format of the structure cache directory 322 may be adapted to the type of information actually stored in the memory objects that are being cached in the structure cache 320 and how they are accessed. For example, if a memory object stores personnel data, the structure cache directory 322 may have index records with a format that utilizes the name or social security number of the personnel objects/structures. As another example, if the structure cache 320 stores structured objects corresponding to memory objects having vehicle information, the structure cache directory 322 may have index records that use license plate numbers.

Another way to access structured objects in the structure cache 320 is to consider the fact that they all have a system memory address. As the structure cache 320 only caches a copy of a memory object or a structured object corresponding to the memory object in the local store, the system memory address is effectively another property of every memory object. Thus, the structure cache 320 can also be accessed by a structure cache directory 322 that utilizes system memory address in its index records.

For example, the structure cache directory 322 may have a high-level structure reflective of the organization criteria of the structured objects (such as an application-specific directory), be organized by system addresses, or the like. The structured objects in the structure cache 320 may be organized and accessed via the structure cache directory 322 in a variety of ways. Thus, the structure cache directory 322 provides a way to find data stored in the structure cache 320 and will typically provide at least one key for lookup. The key is a lookup criterion, such as either one or more fields of the structured cache 320 being stored, or some other property associated thereto, such as a system memory address. The structured cache directory 322, corresponding to the key, may be organized in a variety of forms, to optimize for criteria such as insertion time, lookup time, and so forth, and include but not be limited to trees, hashed lists, linked lists, and so forth.

In one illustrative embodiment, when a structured object is to be obtained from the structure cache 320, an application, e.g., the garbage collection accelerator or the like, will call a function (or expanded code corresponding thereto inline) providing the key, and obtain either the memory object, or an address of the memory object's location. As noted above, in one illustrative embodiment, the structure cache directory 322 may be organized according to system memory address of the memory objects, i.e. the location address of the data in system memory. As a result, any form of an index structure used in the structure cache directory 322, such as a linked list, hash list or hash bucket, a tree-structure, etc., may be used to find the location in the local store when the system memory address is known. Thus, for example, the system memory address may be used as a property for a lookup operation. The structure cache directory 322 may be queried to find a local store address of a cached copy of the memory object, corresponding to a structured object in the structure cache 320, which has a home location in system memory at system address "XYZ."

In another illustrative embodiment, the structure cache directory 322 may be organized by the lookup criterion, e.g., if the structure cache 320 contains address records for people, rather than finding these records by system memory address, the structure cache directory 322 may be organized by last name, first name, social security number, etc. Structured objects stored within the structure caches 320 may then be looked up within the structure cache directory 322 according to these lookup criterion rather than system memory address.

Returning again to the garbage collector illustrative embodiment, as set forth above, the first cache data structure, e.g., the operand buffer cache 310, handles contiguous data by allowing the garbage collector to load a contiguous memory block, associated with a memory object to be checked by the garbage collector, into the operand buffer cache 310 and check that contiguous memory block for live pointers. The second cache data structure 320 handles homogeneous collections of important data structures, i.e. memory objects of a like type. It should be noted, however, that for many other memory objects, the locality may not be pronounced enough to support a scheme of storing a single data region for processing and then move to the next region, such as is done with the operand buffer cache 310. Moreover, such memory objects may not have a sufficiently similar type to other memory objects that are stored or represented in structured caches 320.

To exploit locality with such memory objects, a "software cache" 330 is utilized. The software cache 330 is a software abstraction to capture temporal and spatial locality in memory modeled on hardware caches. Like hardware caches, there are a number of equivalence sets, indexed by a set of address bits, and blocks from the equivalence set being selected based on tag, i.e. address range, match checks. Also like hardware caches, equivalence sets in the software cache 330 are selected by a cache index formed from low order address bits. Using a 4-way single instruction multiple data (SIMD) capability, for example, it is possible to efficiently implement a 4-way associative lookup operation. The software cache 330 offers retention between accesses based on address-based lookup operations with data persisting in the local store beyond the use of region-copies used for dense memory references.

The software cache 330 involves a significant overhead in terms of instructions which must be executed by the SPU. For example, this significant overhead includes access latency to compute and compare address ranges or tags, access latency to determine a possible software cache miss, and latency associated with locating a data buffer service as a backing storage. Thus, for objects with regular and predictable access behavior, the software cache 330 should not be used. To the contrary, as noted above, such objects are best used with operand buffer caches 310 or structure caches 320. The software cache 330 is most useful for large data sets with sufficient locality where the benefits of a large cache can often outweigh the penalties of the long "hit latency" of the software cache 330.

These various caching data structures 310-330 are used to enhance the operation of various applications, one example being a garbage collector. With regard to an illustrative embodiment in which the application is a garbage collected, the caching data structures 310-330 are used to enhance the efficiency of the marking phase of the mark-and-sweep garbage collection operation distributed across the control processor and one or more controlled processors. For example, in one illustrative embodiment, in response to garbage collection being initiated, either by the control processor, e.g., PPE 110, or by a SPE 120-134, the garbage collection mechanisms of the illustrative embodiments operate on a portion of the application memory heap brought into the SPE's local store in the manner previously described above. In operating on the portion of the application memory heap, the SPE's garbage collection logic in the MFC takes a memory object from the local mark stack and determines a size of portion of data corresponding to the memory object. Based on the size of the portion of data corresponding to the memory object, the memory object may be categorized into a small heap block memory object which can be handled by the software cache 330 or a large heap block memory object which should be handled by the operand buffer 310, for example. Such categorization may be performed by comparing the size of the portion of data corresponding to the memory object to a predetermined threshold. In one illustrative embodiment, this threshold is equal to or less than a cache line size for the software cache 330.

For the large heap block memory objects, the heap block is loaded into the operand buffer cache 310 and scanned for live memory references. The live memory references are then marked in a corresponding bitmap, which may be stored in a header block (HBLK) maintained in the structure cache 320 in one illustrative embodiment, and the heap block in the operand buffer cache 310 is discarded. Using an operand buffer cache 310 for large heap blocks to be scanned offers two benefits. First, the operand buffer cache 310 reduces the hit latency by removing the access to the software cache tag store and the associated tag check code. Second the use of the operand buffer cache 310 removes references with good, dense spatial locality, but little temporal locality, from the software cache to an optimized cache storing a region to be scanned.

For the small heap block memory objects, the heap block memory objects are stored in the software cache 330 based on the determined access behavior of the memory object, if the access behavior can be determined. Heap block memory objects are stored in the software cache 330 when it has been determined that (1) the heap block memory object is not an HBLK structure and hence, would be stored in the structure cache 320, and (2) that the heap block memory object does not have enough locality of reference to be stored in the operand buffer 310. That is, it is desirable to receive the investment in performing a DMA of the heap block memory object into the operand buffer 310 by having a certain number of data accesses to the data corresponding to the heap block memory object, otherwise the heap block memory object is loaded into the software cache 330. Thus, based on the determined access behavior (i.e., a determination that the access behavior for the heap block memory object does not correspond to the type of access behavior required for moving the heap block memory object to a structure cache 320 or to the operand buffer 310), the heap block memory object is stored in the software cache 330. The software cache 330 operates in a similar manner as is generally known in prior art software cache organizations such that there is a tag check, i.e. an address range check, for memory references in the software cache 330 for each and every memory access to the software cache.

Figure 4:
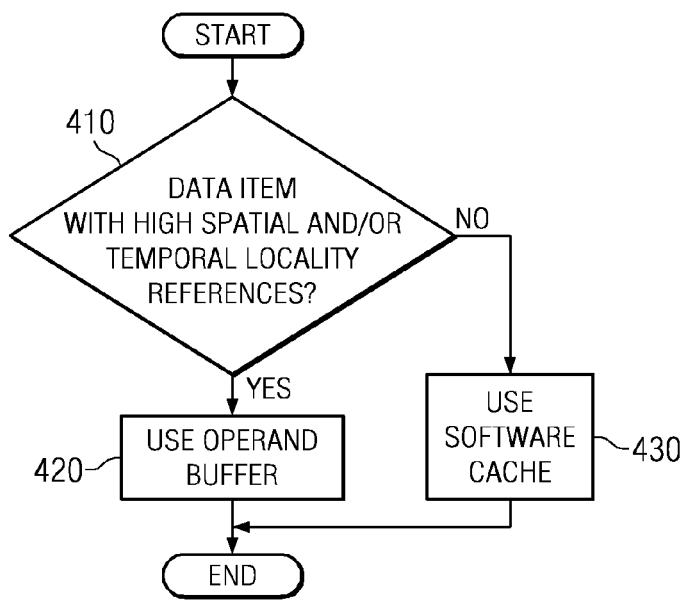
FIG. 4 is an example flowchart outlining an operation for selecting between a operand buffer and a software cache when loading a data item for garbage collection in accordance with one illustrative embodiment.

FIG. 4 is an example flowchart outlining an operation for selecting between an operand buffer and a software cache when accessing a memory object for garbage collection in accordance with one illustrative embodiment. As shown in FIG. 4, a determination is made as to whether the memory object corresponds to a memory object with high spatial or temporal reference locality, or even both high spatial and temporal reference locality (step 410). The particular criteria for determining whether locality is "high" or "low" may be predetermined and stored in the logic implementing the mechanisms of the illustrative embodiments. For example, memory references to 1000 adjacent memory locations (such as in the case of an array access operation) refers to high spatial locality, while referencing the same memory address 1000 times refers to a high temporal locality. Ultimately, whether a locality is high or low is a determination based on estimates by programmers, experimental determination, or derivation from system characteristics, such as operation latencies, DMA latencies, a total number of accesses, etc. A threshold may be established for determining if the number of memory object references to adjacent data values, i.e. adjacent memory locations in system or local memory, is equal to or above this threshold, which would constitute a "high" spatial locality. With regard to temporal locality, the criteria may be a determination as to whether the same memory object, data value, or the like, is accessed repeatedly within a specified time window.

If the references to the memory object are determined to have a high spatial/temporal locality, the memory object is loaded into an operand buffer 310 (step 420). The operation then terminates.

Figure 6:
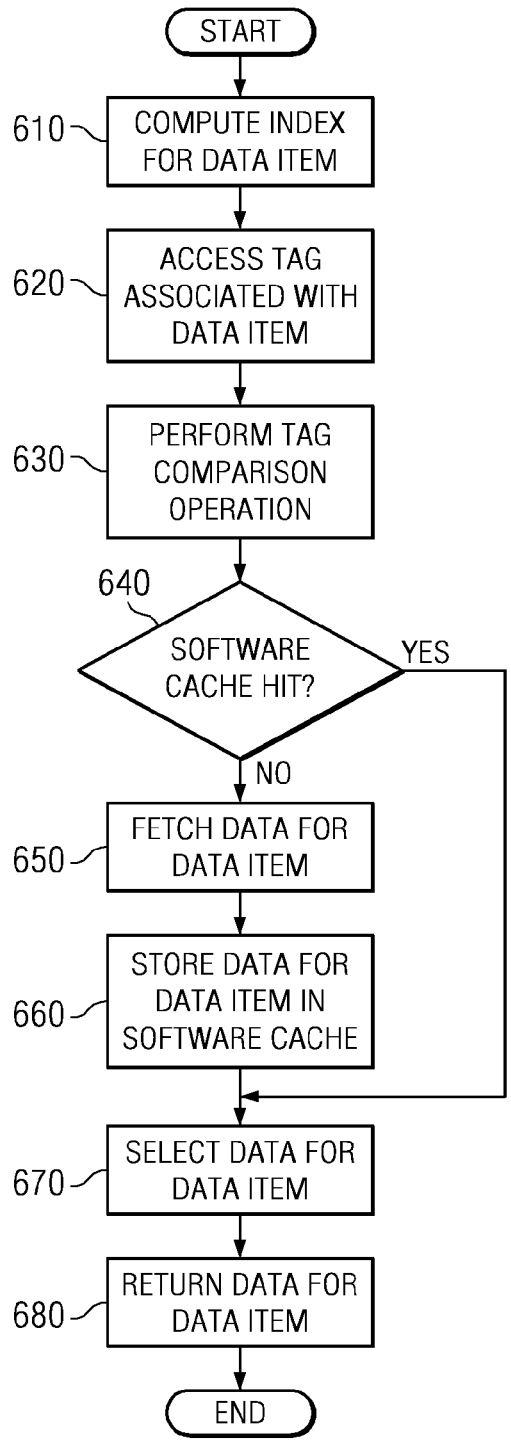
FIG. 6 is an example flowchart outlining an operation of a software cache in accordance with one illustrative embodiment.

The operand buffer 310 can more efficiently capture references to many adjacent data values when a large heap object needs to be scanned as part of the garbage collection. That is, as discussed above, for every software cache the cost of accessing a data item is rather high. This is shown by FIG. 6 hereafter. In comparison, the operand buffer can access a single reference rather cheaply. This is the shown by the single operation in step 720 of FIG. 7, hereafter. Thus, with the operand buffer, every access involves only one step 720, rather than an access encompassing the method in FIG. 6 comprising all of steps 610 to 680. However, fetching the data into the operand buffer can in fact be more expensive than performing all of the steps of FIG. 6. Thus, it only makes sense to pay the cost of fetching the data into the operand buffer if then there is a large number of accesses that each have a massive savings compared to the sequence of steps in FIG. 6. This cost/benefit analysis may be used to set the "threshold" of what constitutes high versus low locality in determining whether accesses should be made with the software cache or operand buffer. The higher the cost of fetching the data into the operand buffer, the more locality must be present to give more gain in the speedup of step 720 in FIG. 7 versus all of the steps in FIG. 6. One way to express this is that it is preferable to use an operand buffer when (DMA cost/possible operand buffer accesses)+operand buffer access cost<(DMA cost/software cache accesses)+software cache access cost. Those skilled in the art will appreciated that in other illustrative embodiments, additional factors may be considered and other cost metrics may be defined without departing from the spirit and scope of the illustrative embodiments.

If the references of the data item are determined to not have a high spatial/temporal locality, the memory object is loaded into the software cache 330 (step 430). The operation then terminates.

FIG. 4 is directed to an operation of the illustrative embodiments in which the application utilized is a garbage collection application. In the particular garbage collection application, the only structured objects considered are header block structured objects and thus, if an object is not a header block structured object, a determination operation as shown in FIG. 4 is utilized to determine where to store the object in the hybrid caching mechanism of the illustrative embodiments. This operation may be more generalized as shown in FIG. 5.

Figure 5:
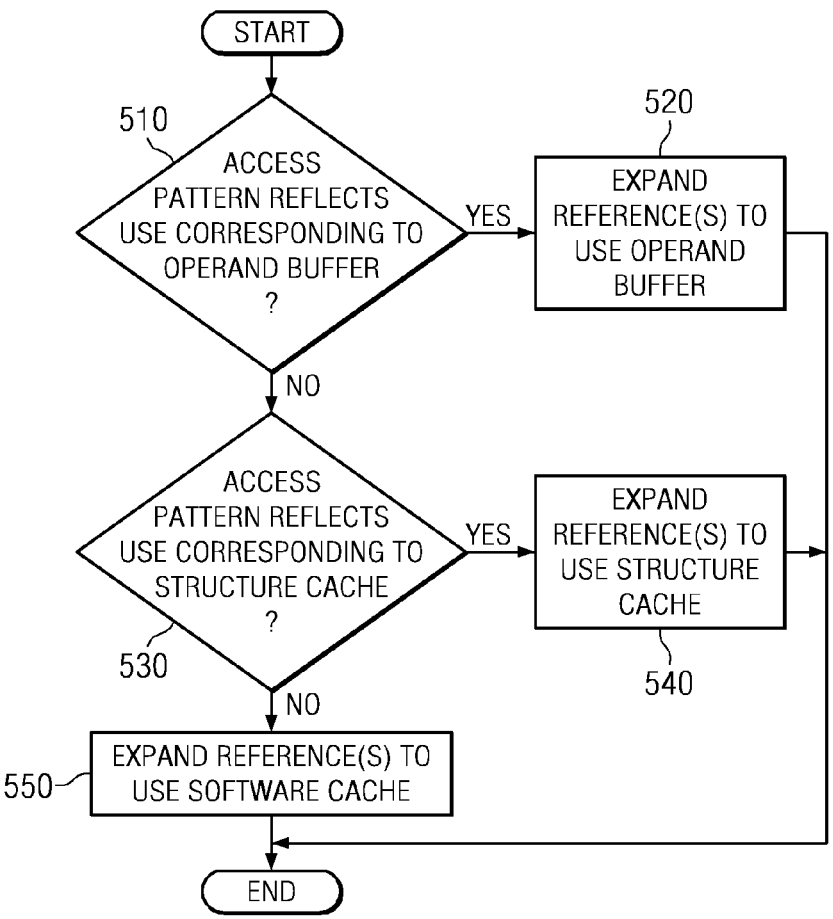
FIG. 5 is an example flowchart outlining an operation for performing a determination as to whether a memory object reference for a data item is to be stored in the operand buffer, structure cache, or software cache in accordance with one illustrative embodiment.

FIG. 5 is an example flowchart outlining an operation for performing a determination as to whether a memory object reference for a data item is to be stored in the operand buffer, structure cache, or software cache in accordance with one illustrative embodiment. FIG. 5 provides an alternative, and more general, illustrative embodiment to that of FIG. 4 in that FIG. 4 is utilized with a garbage collector implementation of the hybrid caching mechanisms of the illustrative embodiments while FIG. 5 may be applied to any type of application that utilizes the hybrid caching mechanisms of the illustrative embodiments. In FIG. 5, with non-garbage collection applications, other structured objects, other than header blocks may be utilized and thus, the characteristics of the access patterns of the object must be utilized to determine whether to place the object in an operand buffer, a structured cache, or the software cache. In one illustrative embodiment, the non-garbage collection application may be a software cache management application whose express purpose is to manage the operation of the hybrid caching data structures 340 in FIG. 3 and the objects within each of the caching data structures.

Thus, the operation outlined in FIG. 5 is a general operation that can be used by a programmer at programming time, by a compiler at a compile time, by the application at runtime, or a combination of two or more of these, to determine for each object in what cache of the hybrid caching mechanism of the illustrative embodiments the object should be stored. The operation outlined in FIG. 4 is operated upon at runtime by the garbage collector application. Thus, the operation outlined in FIG. 4 may be derived from the more general operation of FIG. 5 by making, at programming time, the determination for step 530, that none of the heap blocks would ever be stored in a structure cache.

As shown in FIG. 5, the selection of using the operand buffer, structure cache, or software cache is based on an access pattern, otherwise known as a sequence of data. The operation outlined in FIG. 5 is based on the fact that a programmer or compiler, for example, can detect properties of the access pattern that map well to a specific caching structure in the hybrid caching scheme. In such a case, the sequence of accesses to system memory may be replaced with a sequence of accesses to the specific caching structure.

For example, a dense sequence of reference, such as in the following for-loop:

```
for (i=0; i<1000; i++)
    sum += a[i]
``` the references to a[i] may be detected to have high spatial locality (1000 accesses to adjacent memory locations). In such a case, the compiler may replace this sequence of accesses to system memory with the following:

```
copy_to_operand_buffer(buffer,a)
for (i=0; i<1000; i++)
    sum += buffer[i]
```

In comparison, for a graph printing program, that uses structured objects (such as structures, records, or classes as supported by a variety of programming languages), e.g., C structures or C++ objects, the compiler or programmer may use a structure cache in the following manner. An original graph printing program may have the form:

```
Print_family_tree(person)
{
Printf ("%s has parents:\n", person.name);
Printf("Father of %s is %s", person.name, person.father_name);
Printf("Mother of %s is %s", person.name, person.mother_name);
Printf_family_tree(person.father);
Printf_family_tree(person.mother);
}
```

The references to the system memory may be replaced with references to the structure cache such that the structure cache is accessed rather than the system memory in the following manner:

```
Print_family_tree(person)
{
local_copy=structure_cache_access(person);
Printf ("%s has parents:\n", local_copy.name);
Printf("Father of %s is %s", local_copy.name, local_copy.father_name);
Printf("Mother of %s is %s",
local_copy.name, local_copy.mother_name);
Printf_family_tree(local_copy.father);
Printf_family_tree(local_copy.mother);
}
```

In this illustrative embodiment, anything that does not meet the locality and access property references of the above can be directed to the software cache to extract any residual locality. That is, the code of the object may be analyzed to determine if there is a spatial locality such as described above with the for-loop where there are a large number of memory object references to adjacent memory locations or if there is spatial locality such as described above with the graph printing program in which memory object references are based on one or more common indexable properties of the memory objects. If neither of these conditions are present with regard to the particular object in question, its memory object references may be loaded into the software cache structure. For example, a memory object reference such as "sum+=a[25]" may be replaced with "local_a25=software_cache_access(&a[25]); sum+=local_a25."

As shown in FIG. 5, the operation starts by determining if an access pattern, or sequence of data, reflects use corresponding to the type for which the operand buffer is utilized (step 510). In one illustrative embodiment, the operand buffer is used with objects having memory object references that have a high spatial and/or temporal locality as discussed above. If the access pattern for the object reflects use for which the operand buffer is utilized, then the memory object reference, or series of memory object references, is expanded to use the operand buffer (step 520). What is meant by the term "expanding" is that the system memory access or accesses associated with the memory object references are replaced with an access to the particular caching structure, which in this case is the operand buffer. It is important to expand the memory object references to use the local caching structures because the SPE in which these mechanisms are utilized does not have direct accessibility to the system memory. For example, in the examples shown above, the replacement of "a" with "buffer," "person" with "local_copy," and the access to "a[25]" with "local_a25", plus the appropriate access methods (copy to local store, structure cache access, and software cache access) are the "expansion" of the memory object references.

If the access pattern does not reflect use corresponding to the type for which the operand buffer is utilized, then a determination is made as to whether the access pattern reflects use corresponding to the type for which the structure cache is utilized (step 530). In one illustrative embodiment, an access pattern that accesses memory objects based on one or more common properties of the memory object is the type for which the structure cache is utilized. If the access pattern reflects use corresponding to the type for which the structure cache is utilized, then the memory object reference, or series of memory object references, is expanded to use the structure cache (step 540). If the access pattern does not reflect use corresponding to the type for which the structure cache is utilized, then the memory object reference, or series of memory object references, is expanded to use the software cache (step 550). The operation then terminates.

FIG. 6 is an example flowchart outlining an operation of a software cache in accordance with one illustrative embodiment. The operation outlined in FIG. 6 may be initiated in response to step 430 in FIG. 4 or step 550 in FIG. 5, for example.

As shown in FIG. 6, the software cache 330 mechanism computes an index for the data item (step 610) and accesses a tag associated with the data item (step 620). The tag of the data item is then compared to tags of items already in the software cache 330 (step 630). A determination is made as to whether there is a software cache hit based on the tag compare operation (step 640). If not, the data for the data item is fetched (step 650), such as from the system memory for example, and stored in the software cache 310 (step 660). The data for the data item, in the context of garbage collection, is data stored on the application heap of the system, or the portion of the application heap handled by the SPE. Thereafter, or if there is a software cache hit, the data for the data item is selected (step 670) and returned to the application (step 680), e.g., garbage collector, which then may utilize the data item in a variety of different ways. For a garbage collector application implementation of the illustrative embodiments, the data item may be used such that the garbage collector checks the references of the data item to see if they are live in a normal garbage collection fashion. The operation then terminates.

Figure 7:
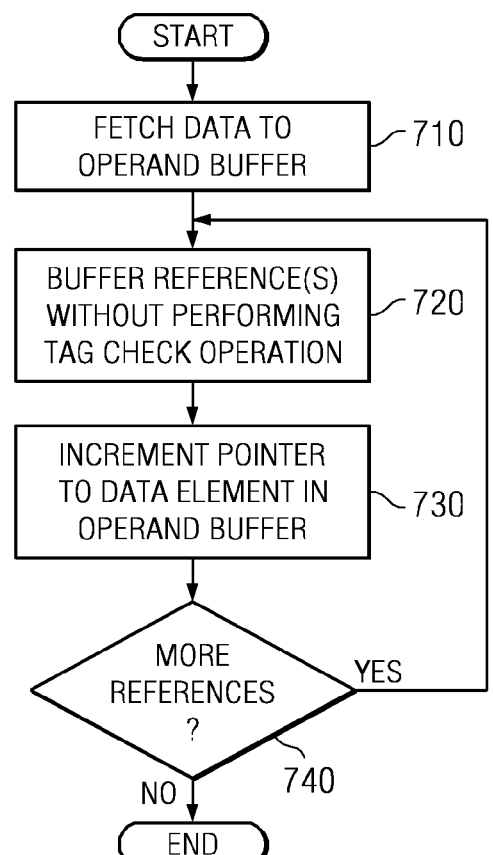
FIG. 7 is an example flowchart outlining an operation of an operand buffer in accordance with one illustrative embodiment.

FIG. 7 is an example flowchart outlining an operation of an operand buffer in accordance with one illustrative embodiment. The operation of FIG. 7 may be initiated in response to step 420 in FIG. 4, for example.

As shown in FIG. 7, the first data corresponding to the data item, as well as immediately nearby data that can be fit into a buffer, are fetched, such as from the system memory for example, and stored in the buffer (step 710). When a next memory object reference is requested to the nearby data, the nearby data is already in the operand buffer 310, based on a slot in the operand buffer 310 pointed to by a reference pointer associated with the operand buffer 310 (step 720). The reference pointer points to individual blocks of data within the operand buffer 310. Because whether a datum is present in the operand buffer can be determined by how far it is from the first data item that initiated the fetching, and the size of the buffer and the amount of data fetched are known when fetching, the buffering and using of the memory object reference in the operand buffer 310 is performed without performing any tag check operation, as is generally used in a software cache 330, e.g., step 630 in FIG. 6.

The reference pointer for the operand buffer 310 is incremented to point to the data element in the operand buffer 310 (step 730). A determination is made as to whether there are more memory object references in the data of the data item to be processed (step 740). If so, the operation returns to step 620 with the operation repeating for the next memory object reference in the fetched data for the data item. If there are no more memory object references to process in the fetched data, the operation terminates.

Figure 8:
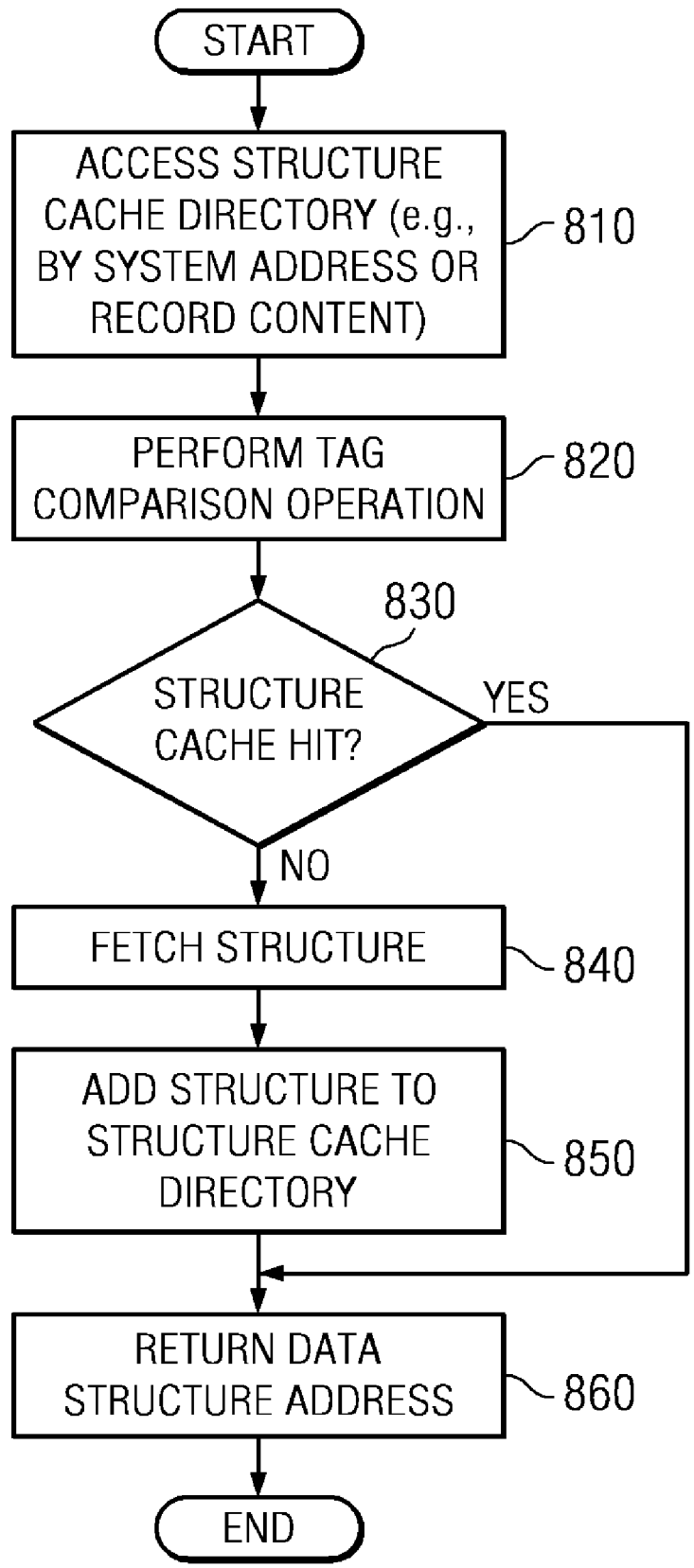
FIG. 8 is an example flowchart outlining an operation of a structured cache in accordance with one illustrative embodiment.

FIG. 8 is an example flowchart outlining an operation of a structure cache in accordance with one illustrative embodiment. With regard to a garbage collection implementation of the illustrative embodiments, the operation outlined in FIG. 8 may be performed whenever a header block is needed before a new heap block is obtained. The header block has object size information that can be used to drive the decision as to how much locality there is in block 410 of FIG. 4, for example.

As shown in FIG. 8, the operation starts with the structure cache directory 322 being accessed (step 810). The structure cache directory 322 may be accessed, for example, by system address, record content, or the like. A tag compare operation is performed between the directory entry obtained based on the accessing of the structure cache directory 322 and a search criteria, e.g., search tag, key, or the like (step 820). A determination is made as to whether there is a structure cache hit based on the tag comparison operation (step 830). If there is not a structure cache hit, the structured object for which the structured cache has been generated, e.g., header block in the case of a garbage collector in accordance with one illustrative embodiment, is fetched (step 840) and the structured object is added to the structure cache directory (step 850). Thus, in step 840, a memory area is allocated to hold the structured object and the structured object is fetched to that memory area. Once the structured object is fetched, in step 850 the appropriate directory entries are made by adding the structured object to the structure cache directory and integrating the structured object in the structure cache directory by whatever way is appropriate for the specific structure cache directory organization. Thereafter, or if there is a structure cache hit, a data structure address is then returned to the application that initiated the accessing of the structured cache, e.g., a garbage collector application in one illustrative embodiment (step 860). The operation then terminates.

It should be appreciated that in some code sequences, memory object references to the same memory object may end up in different caching structures using the mechanisms of the illustrative embodiments described above. For example, a software cache access may be made to an address 0xF000, and the cache line encompassing bytes from 0xF000 to 0xF1FF may be brought into a software cache. At a later time, a memory object may be identified at address 0xF100 with high locality, and brought into the operand buffer. The data from 0xF100 onwards is now both in the software cache and the operand buffer. As a result, one or more coherence actions may be necessary to ensure that there is no corruption of the data associated with the memory objects that are referenced or improper operation of the applications operating on these memory objects.

Figure 9:
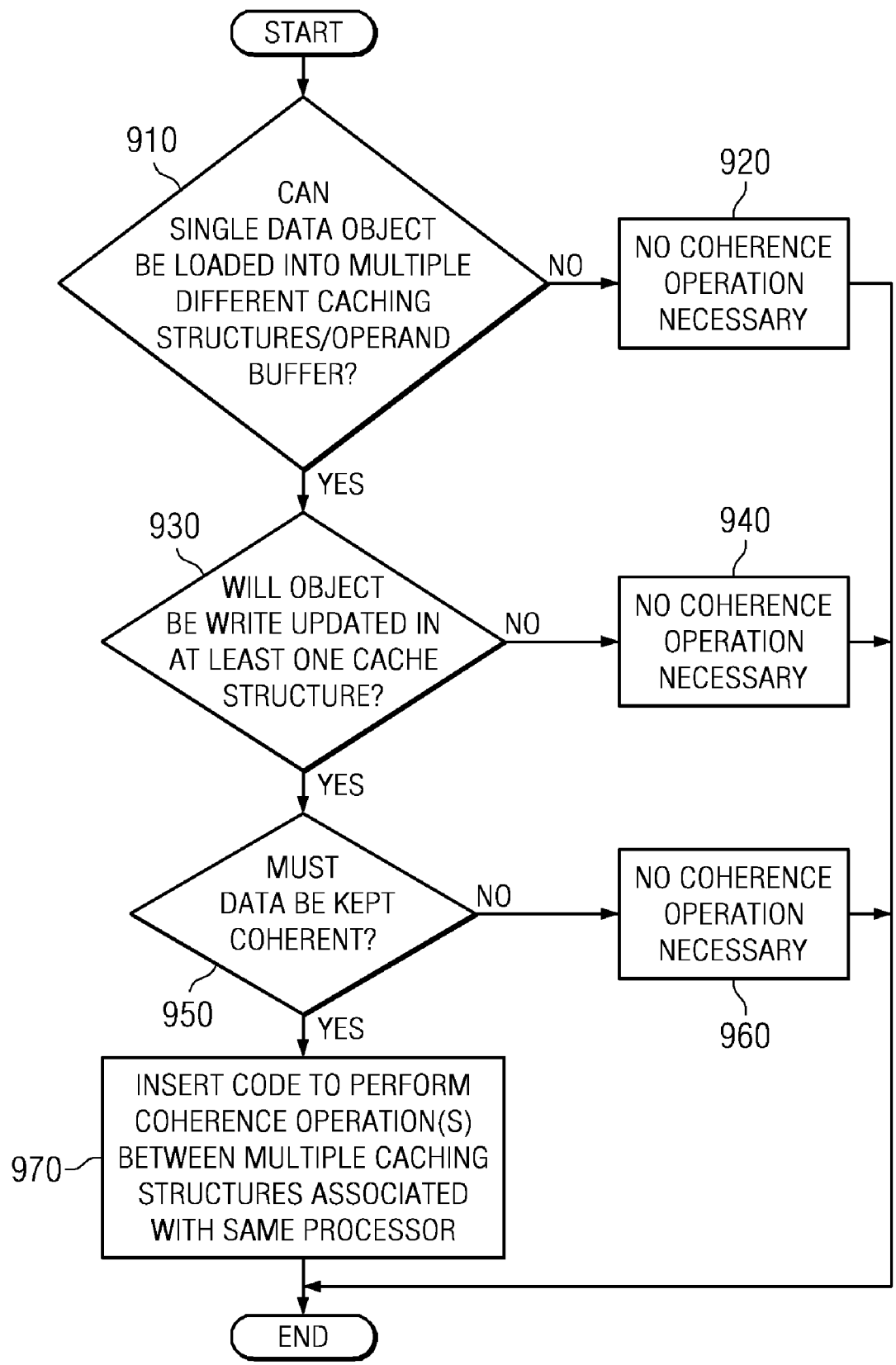
FIG. 9 is an example flowchart outlining an operation for determining whether coherence management is necessary in accordance with one illustrative embodiment.

In one illustrative embodiment, memory object references that are read-only are considered to be inherently coherent. However, memory object references that are written must be kept coherent through one or more coherency operations. FIG. 9 is an example flowchart outlining an operation for determining whether coherence management is necessary in accordance with one illustrative embodiment.

As shown in FIG. 9, the operation starts with a determination as to whether a single memory object can be loaded into multiple different caching structures of the hybrid caching scheme of the illustrative embodiments (step 910). The knowledge of whether a memory object can be loaded into multiple caching structures can be derived from knowledge of the application code. For example, a programmer, during coding of the application, may determine, based on the structure of the application and the manner by which the memory object is referenced, that the memory object can or cannot be placed in multiple caching structures. The result of this decision may then be incorporated into the structure of the application source code. For example, if the decision is that no coherence action is necessary, the outcome of this decision is incorporated into the code by way of non-inclusion of coherence checks for this specific object. If the decision is that coherence action is necessary, the outcome of this decision results in code being inserted to first check if the programmer has specified which of the caching structure that an object should be placed. If a decision is not made by the programmer, the compiler or application, e.g., garbage collector application, can then make a decision as shown in FIG. 4 or FIG. 5, for example. If the memory object cannot be placed in multiple caching structures, then no coherence operation is necessary (step 920).

If the memory object may be placed in multiple caching structures, a determination is made as to whether the memory object will be write-updated in at least one of these caching structures (step 930). To derive whether all accesses of the memory object are read-only or not, i.e. whether the memory object will be write-updated or not, the programmer, a compiler, or some other programming tool, may derive such information or it can be provided by the programmer with the result of the decision being incorporated into the structure of the program source code. If the memory object is not going to be write-updated, i.e. it is read-only, then no coherence operation is necessary (step 940).

If the memory object will be write-updated, i.e. the memory object is not read-only, then a determination is made as to whether the data of the memory object must be kept coherent (step 950). This again is information that may be derived from the application knowledge of the programmer during coding with the result of the decision being incorporated into the structure of the program source code. If the data does not need to be kept coherent, then no coherence operation is necessary (step 960). If the data needs to be kept coherent, code is inserted into the program source code to perform coherence operations between multiple caching mechanisms associated with the same processor (step 970). There are multiple ways to achieve coherency so the code that is inserted may take many different forms. For example, in one illustrative embodiment, when data is written to one caching mechanism, all other caching mechanisms may be flushed either completely or with respect to the particular data item that was written. In another illustrative embodiment, when a data item is written to one copy in one cache mechanism, a determination is made whether the same data is maintained in other cache mechanisms and all such other copies are write-updated as well. Those of ordinary skill in the art will recognize that there may be other methods for establishing coherence between multiple data copies in multiple caching structures or mechanisms and that any of these methods may be used with the mechanisms of the illustrative embodiments without departing from the spirit and scope of the illustrative embodiments.

Figure 10A:
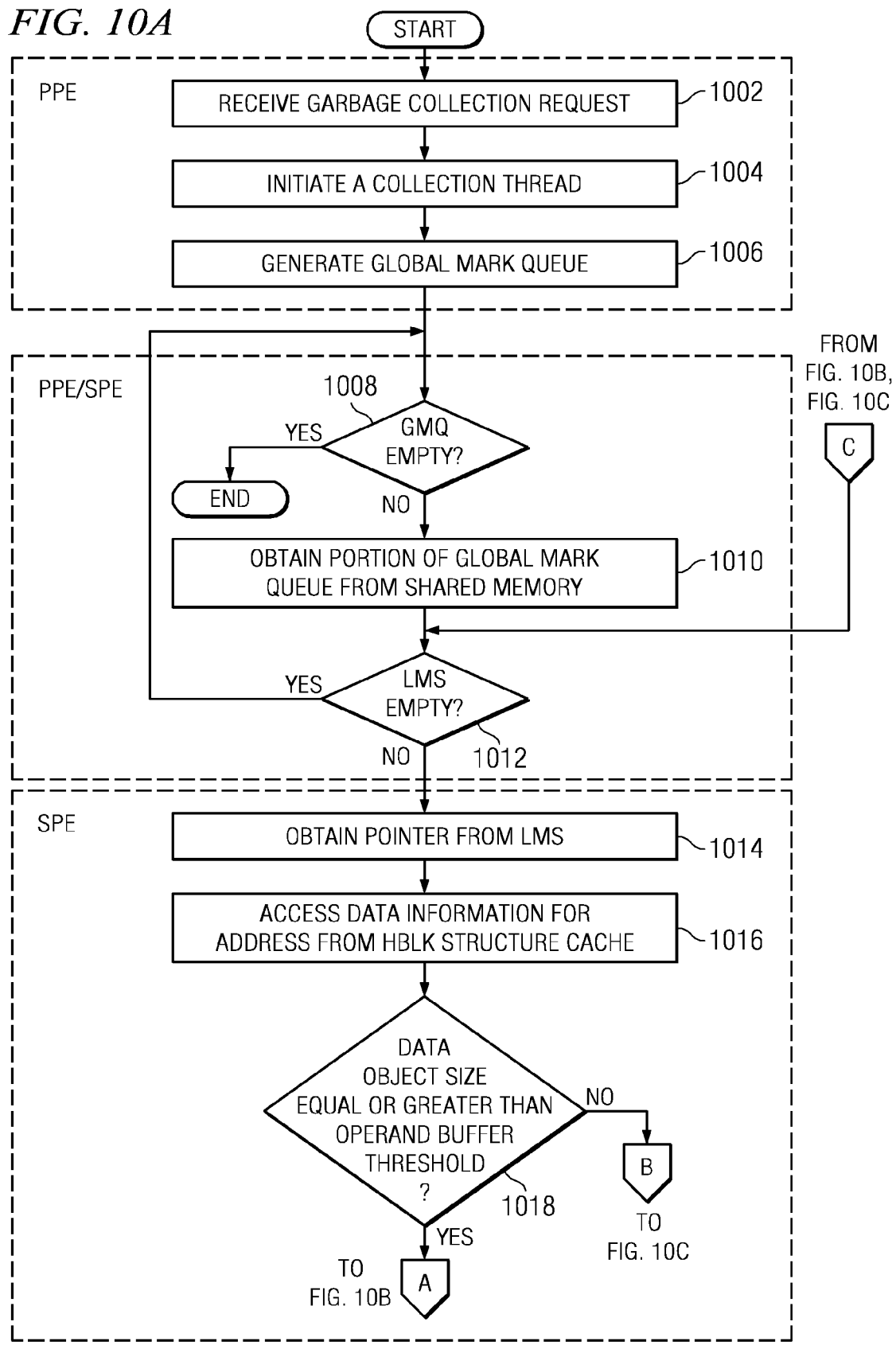
FIGS. 10A-10C depict an example flowchart outlining an operation for performing garbage collection in accordance with one illustrative embodiment.
Figure 10B:
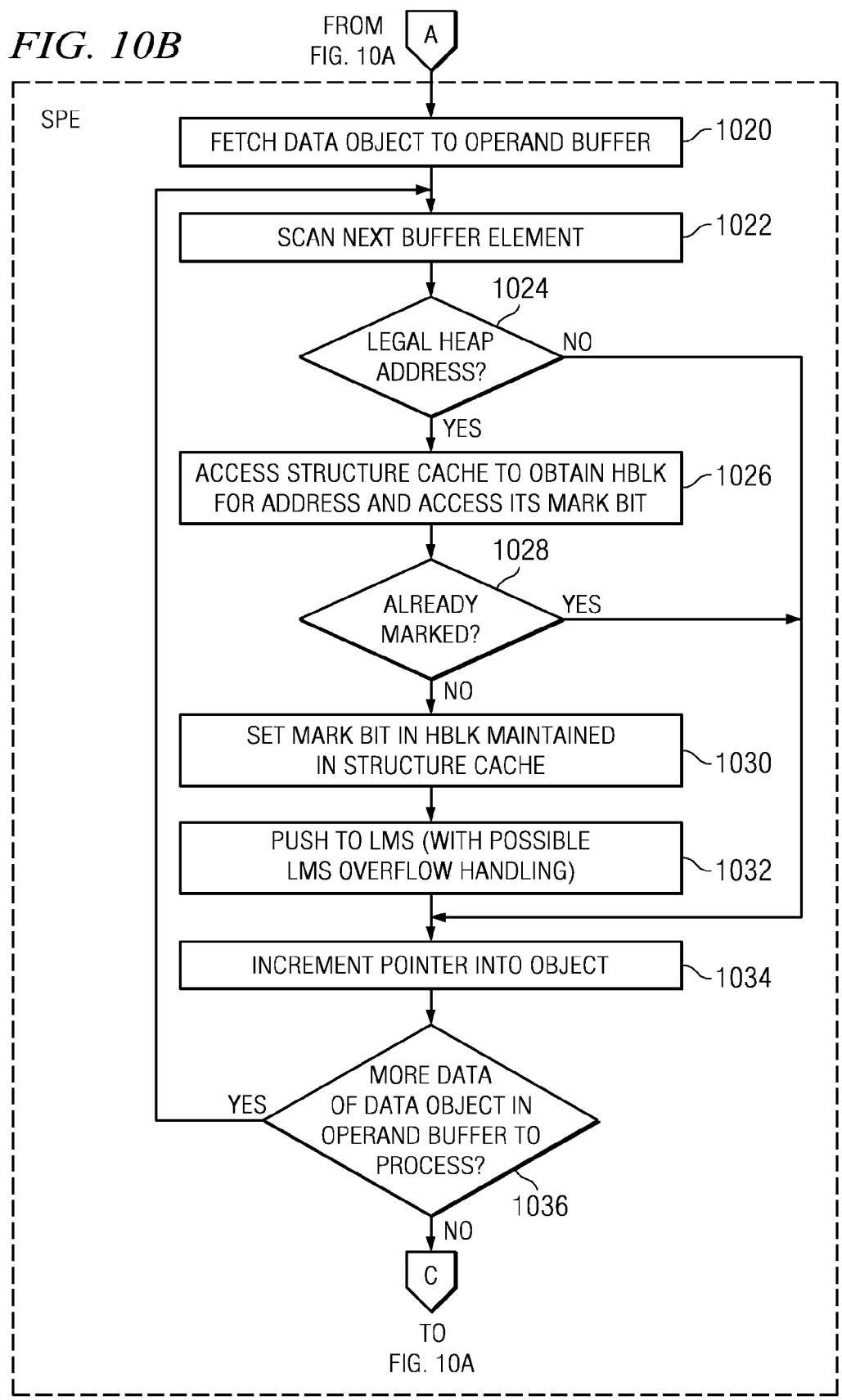
Figure 10C:
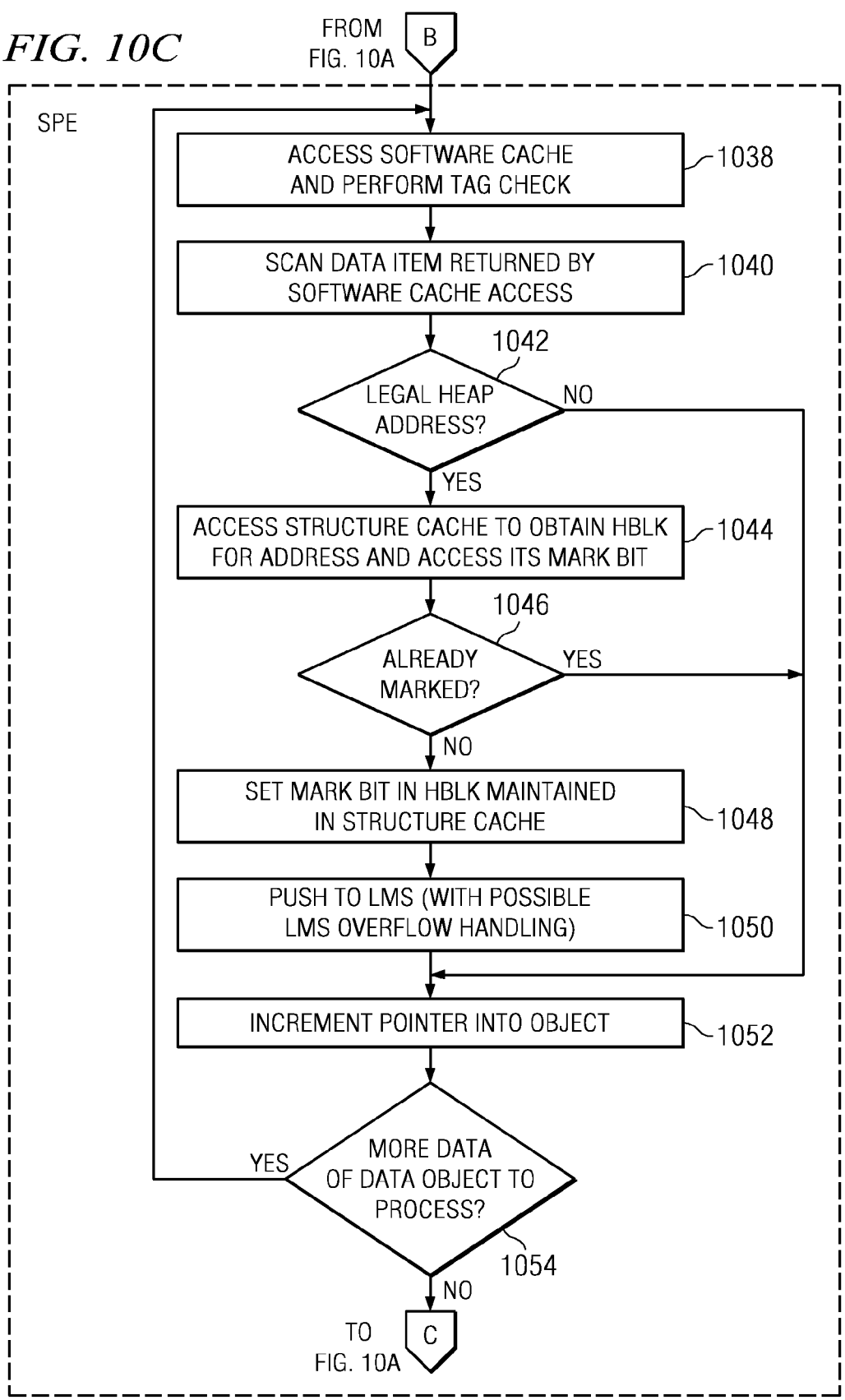
Figure 11A:
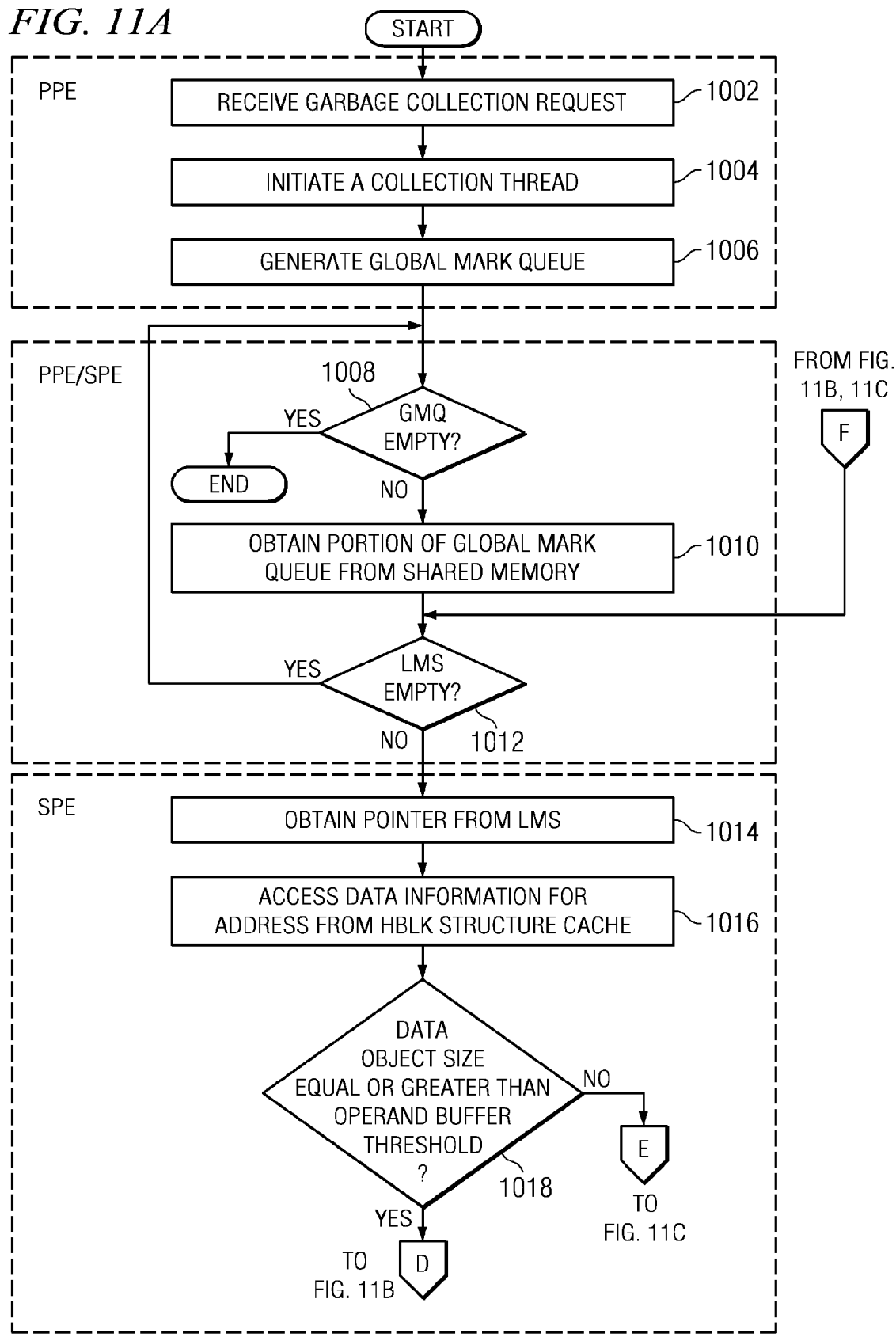
FIGS. 11A-11C depict an example flowchart outlining an operation for performing garbage collection in accordance with an alternative illustrative embodiment.
Figure 11B:
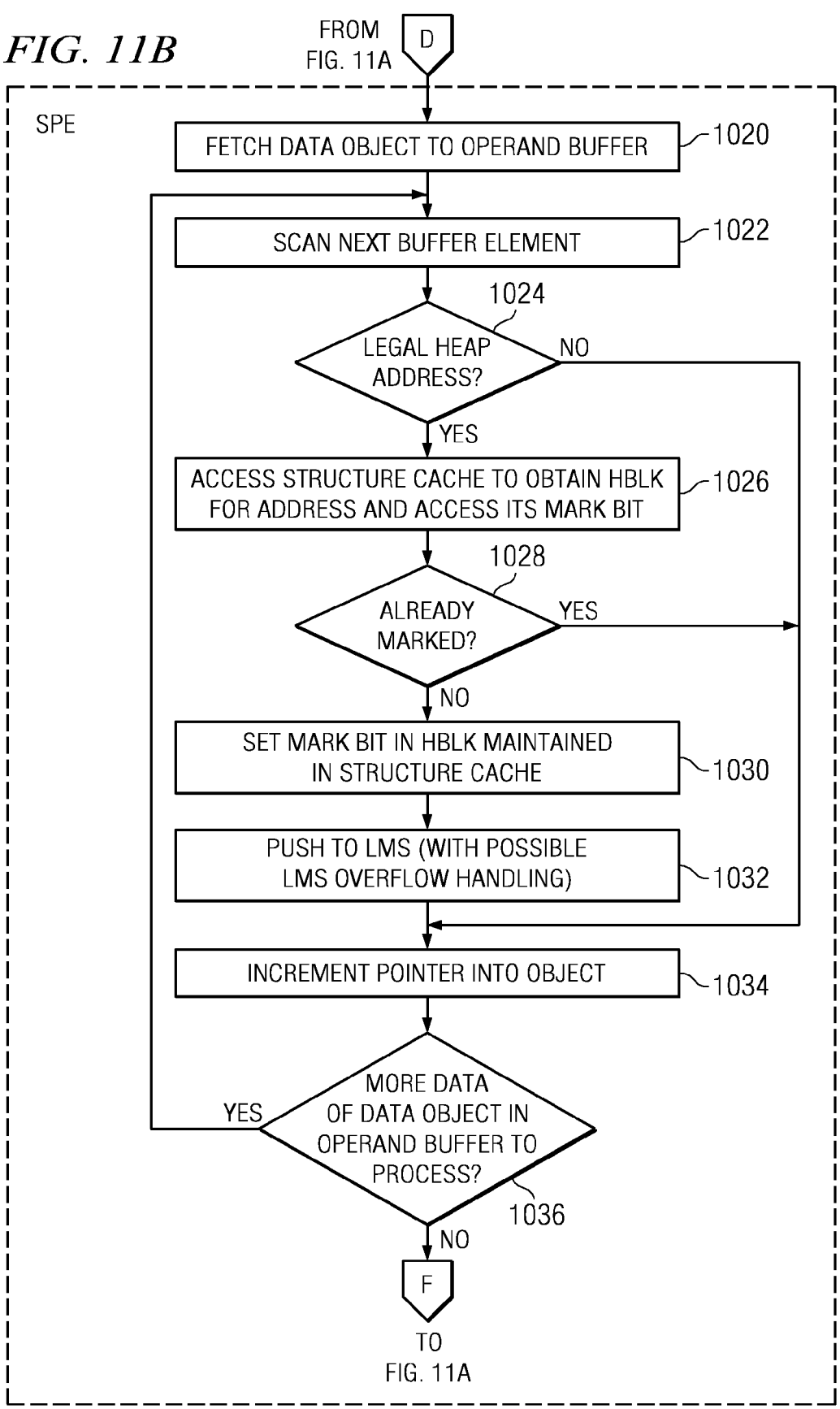
Figure 11C:
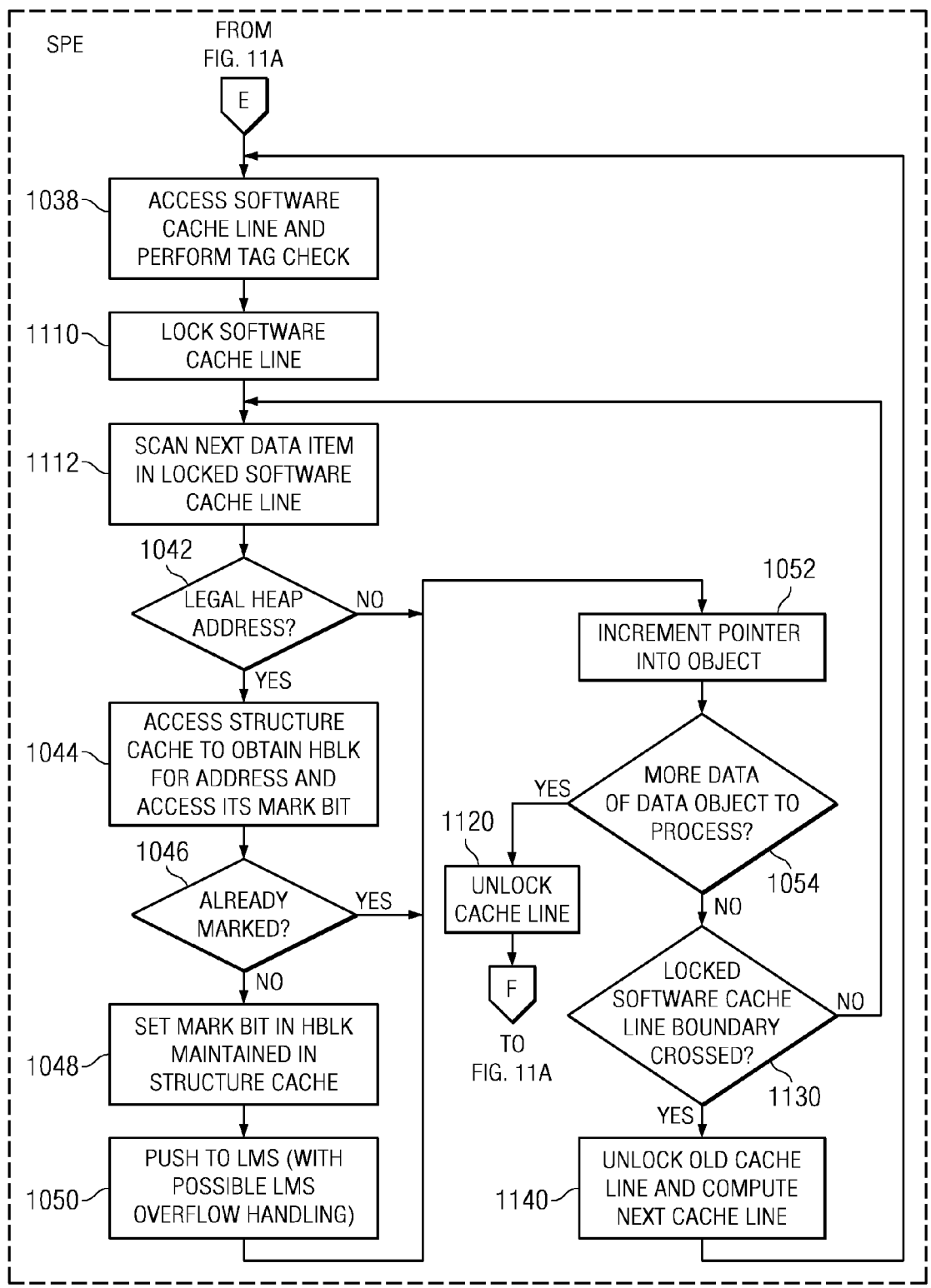

Having shown how each of these individual caching structures operates within the hybrid caching scheme of the illustrative embodiments, an overall operation for performing garbage collection using this hybrid caching scheme will now be described in accordance with two illustrative embodiments. FIGS. 10A-10C depict an example flowchart outlining an operation for performing garbage collection in accordance with one illustrative embodiment. FIGS. 11A-11C depict an example flowchart outlining an operation for performing garbage collection in accordance with an alternative illustrative embodiment in which software cache lines may be locked. In this illustrative embodiment multiple direct accesses into a locked software cache line are performed without tag checks for each access. The software cache line is unlocked following all objects in a software cache line being processed or a cache line boundary being crossed, i.e. after processing of the cache line by the garbage collector.

In either case, it should be noted that the operations outlined in FIGS. 10 and 11 are implemented, in one illustrative embodiment, in a cooperative manner between the control processor, e.g., the PPE, and a controlled processor, e.g., a SPE, acting as a garbage collection accelerator or a separate garbage collection accelerator other than a SPE. For example, in one illustrative embodiment, the steps indicated by the dashed box labeled "PPE" are executed by the control processor or PPE. The steps indicated in the dashed box "PPE/SPE" are cooperatively executed between the control processor and the accelerator, e.g., the PPE and the SPE. In one illustrative embodiment, the local mark stack (LMS) may be checked locally on the SPE and if the LMS is empty, a new portion of the global mark queue (GMQ) is obtained cooperatively, for example. In another illustrative embodiment, all of the steps in the PPE/SPE dashed line box may be performed on the SPE or PPE. In one illustrative embodiment, all of the steps indicated in the dashed "SPE" box are executed on the garbage collection accelerator, e.g., a SPE or a separate garbage collection accelerator. In yet another illustrative embodiment, one, more than one, or all steps indicated to be executed on one or more PPEs may instead be executed on one or more SPEs.

FIGS. 10A-10C depict a flowchart outlining an example operation for performing garbage collection in accordance with one illustrative embodiment. As shown in FIGS. 10A-10C, the operation starts with the SPE receiving an instruction, such as from another SPE or the PPE, to begin garbage collection operations (step 1002). The SPE, or optionally, the PPE, initiates a collection thread which utilizes a garbage collection engine to perform garbage collection on a portion of system or shared memory apportioned to a program identified in the received garbage collection instruction (step 1004). A global mark queue is generated by the PPE for the portion of system or shared memory allocated to the program, i.e. the heap, and initialized (step 1006). A determination is made as to whether the global mark queue (GMQ) is empty or not (step 1008). If the GMQ is empty, the operation terminates.

If the GMQ is not empty, the spawned collection thread obtains a portion of the global mark queue and a corresponding chunk of system or shared memory to copy to the local mark stack (LMS) and the local store, respectively (step 1010). A determination is made as to whether the LMS is empty or not (step 1012). If the LMS is empty, then the operation returns to step 1008. Otherwise, the collection thread obtains a pointer from the LMS (step 1014) and accesses data information for the address from the header block (HBLK) structure cache, e.g., structure cache 320 in FIG. 3 (step 1016). A determination is then made as to whether the data object size is equal to or bigger than a threshold to use the operand buffer (step 1018).

If the size of the data object is equal to or bigger than a threshold to use the operand buffer, i.e. a threshold above or equal to which the object is best handled by the operand buffer, then the data object is fetched to the operand buffer (step 1020). A next buffer element in the operand buffer is scanned (step 1022) and a determination is made as to whether the buffer element contains a legal, or live, heap address (step 1024). If the buffer element contains a legal heap address, where "legal" means that the address is within the portion of the application heap, then the structure cache is accessed to obtain the HBLK for the address and access the mark bit (step 1026). That is, a check is performed as to whether the address is between the addresses recorded for the start and the end of the application heap. Additional checks may be present, such as "blacklisting" of pages, or other techniques for determining whether a specific address might be an address corresponding to a heap address without departing from the spirit and scope of the illustrative embodiments.

A determination is made as to whether the mark bit associated with the address indicates the address to be already marked (step 1028). If the mark bit indicates the address is not already marked, then the mark bit in the HBLK is set (step 1030) and the address is pushed to the LMS, with the possible handling of an LMS overflow if this occurs by returning entries in the LMS to the GMQ (step 1032).

Thereafter, if the buffer element does not have a legal heap address (step 1024), or if the mark bit indicates that the address is already marked, the pointer is incremented to point to the next buffer element (step 1034). A determination is made as to whether there are more objects in the operand buffer (step 1036). If so, the operation returns to step 1020. If not, the operation returns to step 1012 where either a next element is retrieved from the local mark stack (LMS) in step 1014 or a next portion of the GMQ is obtained by the collection thread in step 1008, responsive to a check whether the LMS is empty or not (step 1012).

If the data object size is smaller than the threshold to use the operand buffer, then the software cache is accessed using a tag check operation (step 1038). The data item that is returned by the accessing of the software cache is scanned (step 1040). A determination is made as to whether the address contained in the data item is a legal heap address (step 1042). If the address of the data item is a legal heap address, then the structure cache is access to obtain the HBLK for the address and access the mark bit (step 1044). A determination is made as to whether the HBLK indicates that the address has already been marked (step 1046). If the mark bit indicates the address is not already marked, then the mark bit in the HBLK is set (step 1048) and the address is pushed to the LMS, with the possible handling of an LMS overflow if this occurs by returning entries in the LMS to the GMQ (step 1050).

Thereafter, if the buffer element does not have a legal heap address (step 1042), or if the mark bit indicates that the address is already marked, the pointer is incremented to point to the next word in the heap object (step 1052). A determination is made as to whether there are more words in the heap object (step 1054). If so, the operation returns to step 1038. If not, the operation returns to step 1012 where either a next element is retrieved from the local mark stack (LMS) in step 1014 or a next portion of the GMQ is obtained by the collection thread in step 1008, responsive to a check whether the LMS is empty or not (step 1012).

FIGS. 11A-11C depict a flowchart outlining an example operation for performing garbage collection in accordance with another illustrative embodiment. As shown in FIG. 11A, the operation is essentially the same as FIGS. 10A-10C with the exception of steps 1110-1140 and thus, the common steps between FIGS. 10A-10C and FIGS. 11A-11C are labeled with like reference numerals and their description will not be repeated here. With regard to steps 1110-1140, after the cache line in the software cache is accessed in step 1038, the cache line is locked (step 1110) and a next data item in the locked cache line is scanned (step 1112). After step 1054, if there are no more words in the object that need to be processed, the cache line is unlocked (step 1120) and the operation returns to step 1012. If there are more objects to be processed, a determination is made as to whether the cache line boundary of the current software cache line has been crossed (step 1130). If not, the operation returns to step 1040. If the software cache line boundary has been crossed, then the old cache line is unlocked and a next cache line is computed (step 1140). The operation then returns to step 1038. In this way, cache lines in the software cache may be freed for replacement immediately following processing of the objects in the cache line by the garbage collector. This increases the efficiency by which the software cache may be utilized for garbage collection by eliminating the need for repeated tag checks when a line has been locked.

Figure 12:
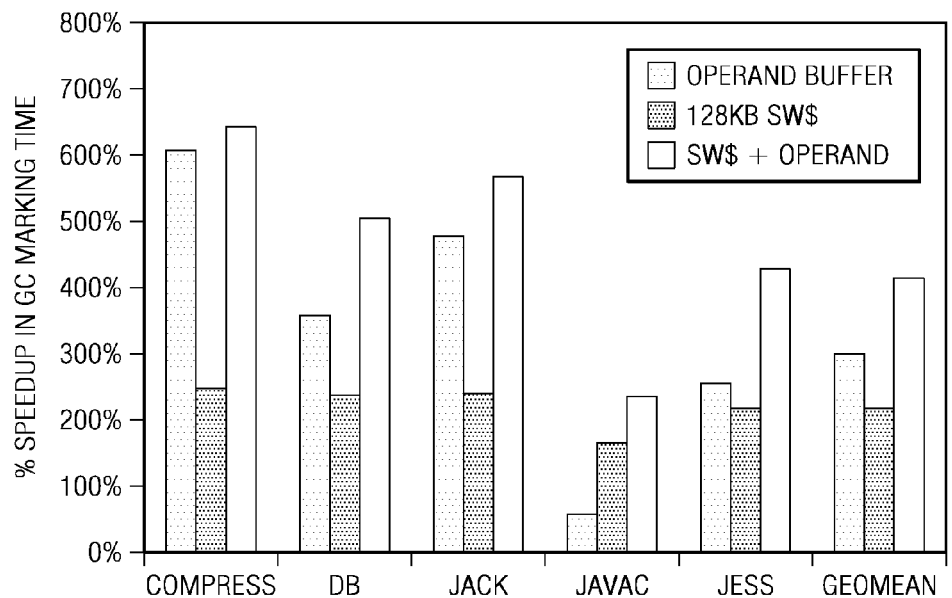
FIG. 12 is an example graph that quantifies the performance improvement in SPE mark time of a 128 KB software cache with a 512 Byte cache line size compared to a baseline design, a pure operand buffering approach, and a hybrid approach including both a 128 KB software cache and operand buffering.

FIG. 12 quantifies the performance improvement in SPE mark time of a 128 KB software cache with a 512 Byte cache line size compared to the baseline design, and a pure operand buffering approach, i.e. using the operand buffer cache 320 described above. While the application memory heap traversal references each heap location only once, because marked blocks are not traversed again, the cache lines allow the garbage collection mechanisms to exploit limited spatial locality with the preloading or prefetching effects of nearby objects that are in the same cache lines as the requested reference. The performance improvement comes from when these nearby objects are requested by the garbage collection mechanism, they would already be present in the software cache and therefore saving the work of requesting them from the memory by the MFC.

For large blocks, which may span one or multiple cache lines, no prefetch effect can be gained because they will not be co-located with other blocks, or a sufficient number of blocks will not share a line size for this effect to be effective. Thus, operand buffer caches 310 are more beneficial for these accesses. To match and exploit the different behavior patterns, the hybrid caching mechanisms of the illustrative embodiments may partition memory blocks into those using an operand buffer cache 310 and those using the software cache 330, as described previously. The "SW$+Operand" of FIG. 12 represents this hybrid garbage collection mechanism using a software cache 330 for small heap block memory objects and operand buffer caches 310 for large heap blocks to be scanned using the operation outlined in FIG. 4, for example. As can be seen from FIG. 12, the hybrid garbage collection approach of the illustrative embodiments provides a greater speedup in time required to perform the garbage collection marking phase than using either the operand buffer cache alone, or the software cache alone (which would correspond roughly to traditional garbage collection marking phase performance).

Figure 13:
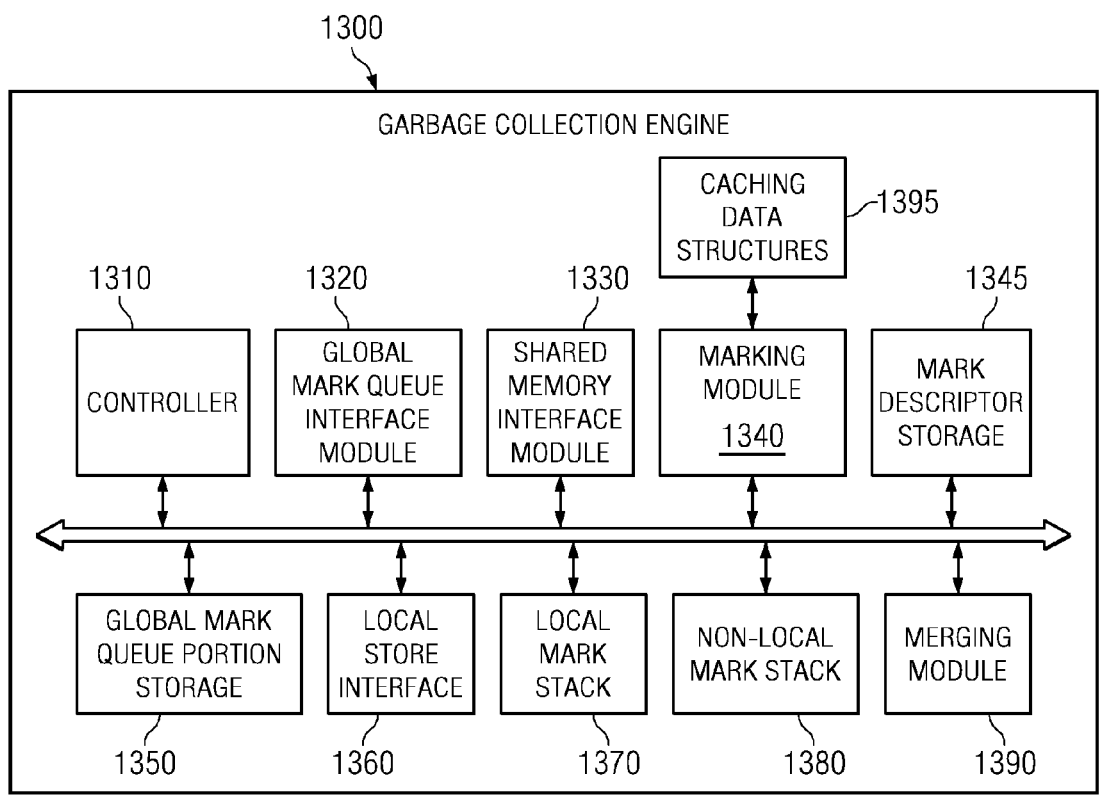
FIG. 13 is an example diagram of a garbage collection mechanism that may be used to perform garbage collection in accordance with one illustrative embodiment.

FIG. 13 is an example diagram of a garbage collection mechanism that may be used to perform garbage collection in accordance with one illustrative embodiment. The garbage collection mechanism shown in FIG. 13 may be integrated into the memory flow controllers (MFCs), such as MFC 200 in FIG. 2, of the SPEs 120-134 of FIG. 1, for example. As such, the garbage collection mechanism in FIG. 13 may make use of MFC registers 240, MMIO interface 250, MFC command queue 280, and the like, to perform the garbage collection operations of the illustrative embodiments.

In one illustrative embodiment, the garbage collection mechanism makes use of MFC commands to obtain the portion of the global mark queue and corresponding chunk of system memory, with the portion of the global mark queue being stored in the MFC registers 240 and the chunk of system memory being stored in the local store associated with the MFC. Moreover, MFC commands may be used to perform the mark-and-sweep operation as well as the merge operation with the various mark stacks being maintained by the MFC in the MFC registers 240, for example.

As shown in FIG. 13, the garbage collection engine 1300 includes a controller 1310, a global mark queue interface module 1320, a system memory interface module 1330, a marking module 1340, a structure cache 1345 for HBLK storage maintaining mark descriptors, local store interface 1360, local mark stack storage 1370, merging module 1390, and hybrid cache for scanning of heap objects. The elements 1310-1395 may be implemented as hardware, software, or any combination of hardware and software. In an illustrative embodiment, the elements 1310-1340, 1360 and 1390 are implemented as software functions, such as MFC functions, performed by one or more processing elements while elements 1345, 1350, 1370, 1380, and 1395 may be implemented as hardware elements, such as memories, registers, or the like. Alternatively, all of the elements shown in FIG. 13 may be implemented as hardware devices that may be integrated into the MFC or other parts of the SPEs or as a dedicated unit in the SPEs.

The controller 1310 controls the overall operation of the garbage collection engine 1300 and orchestrates the operation of the other elements 1320-1395. The global mark queue interface module 1320 is responsible for providing a mechanism to retrieve portions of the global mark queue for use by the garbage collection engine 1300 in performing garbage collection operations in accordance with the illustrative embodiments. The portion of the global mark queue retrieved via the global mark queue interface module 1320 is used to initialize the local mark stack (LMS) for use in performing the garbage collection operations.

The system memory interface module 1330 is responsible for providing a mechanism to retrieve a portion of the system memory for storing in the local store via local store interface 1360. The portion of the system memory that is retrieved corresponds to the portion of the global mark queue retrieved via the global mark queue interface module 1320. The global mark queue interface module 1320 and system memory interface module 1330 communicate with the PPE, under the direction of the controller 1310 in accordance with a garbage collection methodology programmed into the controller 1310, so as to retrieve an appropriate portion of the global mark queue and corresponding portion of the system memory.

The marking module 1340 is responsible for tracing of addresses in objects pointed to by addresses on the LMS, pushing traced addresses on the LMS, and updating mark descriptors. As part of the marking operation, references to memory objects in the local mark stack retrieved by the controller 1310 via the global mark queue interface module 1320 are added to the local mark stack storage 1370. These references are then checked by the marking module 1340 using a mark operation of a mark-and-sweep garbage collection operation to thereby identify reachable memory objects and/or memory objects that are not reachable within the chunk of system memory retrieved and stored in the local store via the system memory interface module 1330 and local store interface 1360. The marking module 1340, as part of the marking operation, may utilize the caching data structures 1395, which may include the operand buffer cache 310, structure cache 320, and software cache 330 of FIG. 3, for example, in the manner previously described, to perform the marking operation in a more efficient manner than in previously known mark-and-sweep garbage collectors.

After the marking module 1340 performs the marking of reachable memory objects and a local mark stack overflow is detected, the merging module 1390 performs merge operations to merge a portion of the local mark stack into a global mark stack and de-allocate this portion.

Thus, the illustrative embodiments provide a mechanism for utilizing a hybrid caching scheme and for performing garbage collection in a heterogeneous multiprocessor system using such a hybrid caching scheme. The garbage collection may be performed in parallel upon a plurality of processors in the heterogeneous multiprocessor system with results being merged to appropriately to identify those system memory objects that are reachable and those that are not. The hybrid caching scheme is based on memory reference access behaviors so as to make the marking phase of the garbage collection more efficient and faster with regard to execution time. In this way, an efficient garbage collection methodology is provided that utilizes the power of each of the processors in the multiprocessor system.

It should be noted that while the above embodiments are described in terms of a distributed garbage collection operation, the present invention is not limited to such. Rather, a single processor in the heterogeneous multiprocessor system may be allocated to performing garbage collection operations without departing from the spirit and scope of the present invention. Since the local store of such a processor has limited size, it is still necessary to perform the copying in of the portion of the global mark queue and corresponding portion of the shared or system memory on which to perform garbage collection. Thus, the same operations as described above may be performed using a single processor rather than a plurality of processors without departing from the spirit and scope of the present invention.

Moreover, it should be appreciated that while the illustrative embodiments are directed to using the hybrid caching mechanisms for purposes of garbage collection, the present invention is not limited to only garbage collection. To the contrary, the hybrid caching mechanisms of the illustrative embodiments may be used to perform various other processing operations by one or more processors in a data processing system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, comprising:
a processor; and
a memory coupled to the processor, wherein the memory comprises instructions which, when executed by the processor, cause the processor to:
determine a measure of a characteristic of a data object, wherein the characteristic is indicative of an access pattern associated with the data object;
select one caching structure, from a plurality of caching structures, in which to store the data object based on the measure of the characteristic, wherein each individual caching structure in the plurality of caching structures stores data objects having a similar measure of the characteristic with regard to each of the other data objects in that individual caching structure;
store the data object in the selected caching structure;

expand a reference to the data object to reference the selected caching structure; and perform at least one processing operation on the data object stored in the selected caching structure, wherein the plurality of caching structures comprises at least one operand buffer cache that stores at least one of representations of data objects having a relatively high spatial locality with regard to one another or representations of data objects having a relatively high temporal locality with regard to one another, at least one structure cache that stores structured objects accessed according to one or more common properties of the objects, wherein the structured objects are objects that store information about data objects, and a software cache that stores representations of data objects that have neither a relatively high spatial or temporal locality with regard to other data objects, wherein the processor selects one cache structure by determining if the measure of the characteristic corresponds to a required measure of the characteristic needed to use the at least one operand buffer structure, and in response to the measure of the characteristic not corresponding to the required measure of the characteristic needed to use the at least one operand buffer structure, determining if the measure of the characteristic corresponds to a required measure of the characteristic needed to use the at least one structure cache.

2. The apparatus of claim 1, wherein the operand buffer cache stores a contiguous memory block of a data object associated with memory regions containing homogeneous data, and wherein the at least one structure cache stores representations of data objects having a similar data object type.

3. The apparatus of claim 2, wherein the processor selects one caching structure from the plurality of caching structures in which to store the data object based on the measure of the characteristic by determining if the measure of the characteristic corresponds to a measure of the characteristic required to use the at least one operand buffer cache, and wherein the processor stores the data object in the selected caching structure by storing a contiguous memory block corresponding to the data object in the at least one operand buffer cache in response to a determination that the measure of the characteristic corresponds to the required measure of the characteristic needed to use the at least one operand buffer cache.

4. The apparatus of claim 3, wherein the processor selects one caching structure from the plurality of caching structures in which to store the data object based on the measure of the characteristic by determining if the measure of the characteristic corresponds to a required measure of the characteristic needed to use the at least one structure cache, and wherein the processor stores the data object in the selected caching structure by storing a representation of the data object in the at least one structure cache if the measure of the characteristic corresponds to a required measure of the characteristic needed to use the at least one structure cache.

5. The apparatus of claim 4, wherein the processor stores the data object in the selected caching structure by storing the data object in a software cache of the plurality of caching structures in response to a determination that the measure of the characteristic does not correspond to a required measure of the characteristic needed to use the at least one structure cache or a required measure of the characteristic needed to use the at least one operand buffer cache.

6. The apparatus of claim 2, wherein the instructions further cause the processor to:

access a structure cache directory associated with the at least one structure cache based on at least one of a system address or a record content for a data object of interest;

determine if the data object of interest is in the at least one structure cache based on results of accessing the structure cache directory; and fetch the data object of interest into the at least one structure cache and update the structure cache directory to identify the data object of interest in the at least one structure cache, in response to a result of the determination indicating that the data object of interest is not in the at least one structure cache.

7. The apparatus of claim 1, wherein the characteristic is memory reference access behavior, and wherein the measure of the characteristic is a measure of locality of the memory reference access behavior.

8. The apparatus of claim 1, wherein the at least one processing operation is a garbage collection operation, and wherein:

the data object is a heap block and is retrieved from a mark stack as part of the garbage collection operation, selecting a caching structure comprises:

determining if a size of the data object is equal to or larger than a threshold value associated with the at least one operand buffer, wherein the size of the data object is the measured characteristic of the data object;

selecting the at least one operand buffer in response to the size of the data object being equal to or larger than the threshold value; and selecting the software cache in response to the size of the data object being less than the threshold value.

9. The apparatus of claim 1, wherein the instructions further cause the processor to:

determine if the data object can be loaded into more than one caching structure of the plurality of caching structures;

determine if data associated with the data object is to be kept coherent, in response to determining that the data object can be loaded into more than one caching structure of the plurality of caching structures; and inserting code into an application code to perform one or more coherence operations between the more than one caching structures of the plurality of caching structures.

10. A computer program product comprising a computer readable storage device having a computer readable program recorded thereon, wherein the computer readable program, when executed on a computing device, causes the computing device to:

determine a measure of a characteristic of a data object, wherein the characteristic is indicative of an access pattern associated with the data object;

select one caching structure, from a plurality of caching structures, in which to store the data object based on the measure of the characteristic, wherein each individual caching structure in the plurality of caching structures stores data objects having a similar measure of the characteristic with regard to each of the other data objects in that individual caching structure;

store the data object in the selected caching structure;

expand a reference to the data object to reference the selected caching structure; and perform at least one processing operation on the data object stored in the selected caching structure, wherein the plurality of caching structures comprises at least one operand buffer cache that stores at least one of representations of data objects having a relatively high spatial locality with regard to one another or representations of data objects having a relatively high temporal locality with regard to one another, at least one structure cache that stores structured objects accessed according to one or more common properties of the objects, wherein the structured objects are objects that store information about data objects, and a software cache that stores representations of data objects that have neither a relatively high spatial or temporal locality with regard to other data objects, wherein the computing device selects one cache structure by determining if the measure of the characteristic corresponds to a required measure of the characteristic needed to use the at least one operand buffer structure, and in response to the measure of the characteristic not corresponding to the required measure of the characteristic needed to use the at least one operand buffer structure, determining if the measure of the characteristic corresponds to a required measure of the characteristic needed to use the at least one structure cache.

11. The computer program product of claim 10, wherein the operand buffer cache stores a contiguous memory block of a data object associated with memory regions containing homogeneous data, and wherein the structure cache stores representations of data objects having a similar data object type.

12. The computer program product of claim 11, wherein the computer readable program causes the computing device to select one caching structure from the plurality of caching structures in which to store the data object based on the measure of the characteristic by determining if the measure of the characteristic corresponds to a measure of the characteristic required to use the at least one operand buffer cache, and wherein the computer readable program causes the computing device to store the data object in the selected caching structure by storing a contiguous memory block corresponding to the data object in the at least one operand buffer cache in response to a determination that the measure of the characteristic corresponds to the required measure of the characteristic needed to use the at least one operand buffer cache.

13. The computer program product of claim 12, wherein the computer readable program causes the computing device to select one caching structure from the plurality of caching structures in which to store the data object based on the measure of the characteristic by determining if the measure of the characteristic corresponds to a required measure of the characteristic needed to use the at least one structure cache, and wherein the computer readable program causes the computing device to store the data object in the selected caching structure by storing a representation of the data object in the at least one structure cache if the measure of the characteristic corresponds to a required measure of the characteristic needed to use the at least one structure cache.

14. The computer program product of claim 13, wherein the computer readable program causes the computing device to store the data object in the selected caching structure by storing the data object in a software cache of the plurality of caching structures in response to a determination that the measure of the characteristic does not correspond to a required measure of the characteristic needed to use the at least one structure cache or a required measure of the characteristic needed to use the at least one operand buffer cache.

15. The computer program product of claim 10, wherein the characteristic is memory reference access behavior, and wherein the measure of the characteristic is a measure of locality of the memory reference access behavior.

16. The computer program product of claim 10, wherein the at least one processing operation is a garbage collection operation, and wherein:
the data object is a heap block and is retrieved from a mark stack as part of the garbage collection operation,
selecting a caching structure comprises:
determining if a size of the data object is equal to or larger than a threshold value associated with the at least one operand buffer, wherein the size of the data object is the measured characteristic of the data object;
selecting the at least one operand buffer in response to the size of the data object being equal to or larger than the threshold value; and
selecting the software cache in response to the size of the data object being less than the threshold value.

17. The computer program product of claim 10, wherein the computer readable program is stored in a computer readable storage medium in a server data processing system and wherein the computer readable program is downloaded over a network to a remote data processing system for use in a computer readable storage medium with the remote system.

18. A method, in a data processing system, for caching data objects in at least one caching structure of a plurality of caching structures, comprising:
determining, by a processor of the data processing system, a measure of a characteristic of a data object, wherein the characteristic is indicative of an access pattern associated with the data object;
selecting, by the processor, one caching structure from the plurality of caching structures in which to store the data object based on the measure of the characteristic, wherein each individual caching structure in the plurality of caching structures stores data objects having a similar measure of the characteristic with regard to each of the other data objects in that individual caching structure;
storing the data object in the selected caching structure;
expanding a reference to the data object to reference the selected caching structure; and
performing, by the processor, at least one processing operation on the data object stored in the selected caching structure, wherein the plurality of caching structures comprises at least one operand buffer cache that stores at least one of representations of data objects having a relatively high spatial locality with regard to one another or representations of data objects having a relatively high temporal locality with regard to one another, at least one structure cache that stores structured objects accessed according to one or more common properties of the objects, wherein the structured objects are objects that store information about data objects, and a software cache that stores representations of data objects that have neither a relatively high spatial or temporal locality with regard to other data objects, wherein the processor selects one caching structure by determining if the measure of the characteristic corresponds to a required measure of the characteristic needed to use the at least one operand buffer structure, and in response to the measure of the characteristic not corresponding to the required measure of the characteristic needed to use the at least one operand buffer structure, determining if the measure of the characteristic corresponds to a required measure of the characteristic needed to use the at least one structure cache.

* * * * *